US012649148B2

(12) United States Patent
Tahir

(10) Patent No.: US 12,649,148 B2
(45) Date of Patent: Jun. 9, 2026

(54) V₂AlC@V₂O₅/TiO₂ HETEROJUNCTION COMPOSITE PHOTOCATALYST, PREPARATION METHOD, AND APPLICATION THEREOF

(71) Applicant: United Arab Emirates University, Al Ain (AE)

(72) Inventor: Muhammad Tahir, Al Ain (AE)

(73) Assignee: UNITED ARAB EMIRATES UNIVERSITY, Al-Ain (AE)

( * ) Notice: Subject to any disclaimer, the term of this patent is extended or adjusted under 35 U.S.C. 154(b) by 23 days.

(21) Appl. No.: 18/641,864

(22) Filed: Apr. 22, 2024

(65) Prior Publication Data

US 2025/0325964 A1 Oct. 23, 2025

(51) Int. Cl.
| | |
|---|---|
| *B01J 23/00* | (2006.01) |
| *B01J 19/12* | (2006.01) |
| *B01J 23/22* | (2006.01) |
| *B01J 35/39* | (2024.01) |
| *B01J 35/57* | (2024.01) |
| *B01J 37/00* | (2006.01) |
| *B82Y 30/00* | (2011.01) |

(52) U.S. Cl.
CPC .............. *B01J 23/22* (2013.01); *B01J 19/123* (2013.01); *B01J 35/39* (2024.01); *B01J 35/57* (2024.01); *B01J 37/0009* (2013.01); *B82Y 30/00* (2013.01); *B01D 2255/20707* (2013.01); *B01D 2255/802* (2013.01); *B01J 2219/0892* (2013.01)

(58) Field of Classification Search
None
See application file for complete search history.

(56) References Cited

U.S. PATENT DOCUMENTS

2014/0162130 A1* 6/2014 Barsoum ............... C01B 32/914
429/231.8

FOREIGN PATENT DOCUMENTS

CN 111834135 A * 10/2020 ......... C22C 32/0005

OTHER PUBLICATIONS

CN-111834135-A—English translation (Year: 2020).*

* cited by examiner

*Primary Examiner* — Stefanie J Cohen
(74) *Attorney, Agent, or Firm* — MH2 Technology Law Group, LLP

(57) ABSTRACT

A composite photocatalyst, comprising V₂AlC@V₂O₅/TiO₂ heterojunction. The composite can be either supported or unsupported. Additionally, a process for producing this composite, particularly V₂AlC@V₂O₅/TiO₂, involves the steps of mixing a titanium precursor and an alcohol solvent, and stirring to obtain a first solution; mixing an acid with an alcohol solvent, and stirring to form a second solution; mixing the second solution and the first solution, and stirring to obtain a third solution; dispersing V₂AlC in the alcohol solvent; adding the dispersed V₂AlC to the third solution to get a suspension, and stirring the suspension for a predetermined period; drying the suspension to obtain a dried product; grinding the dried product into fine powder; and calcining the ground product to obtain the composite. The composite photocatalyst can also be used in a CO₂ reduction process, wherein the photocatalyst is irradiated in a photoreactor system.

6 Claims, 20 Drawing Sheets

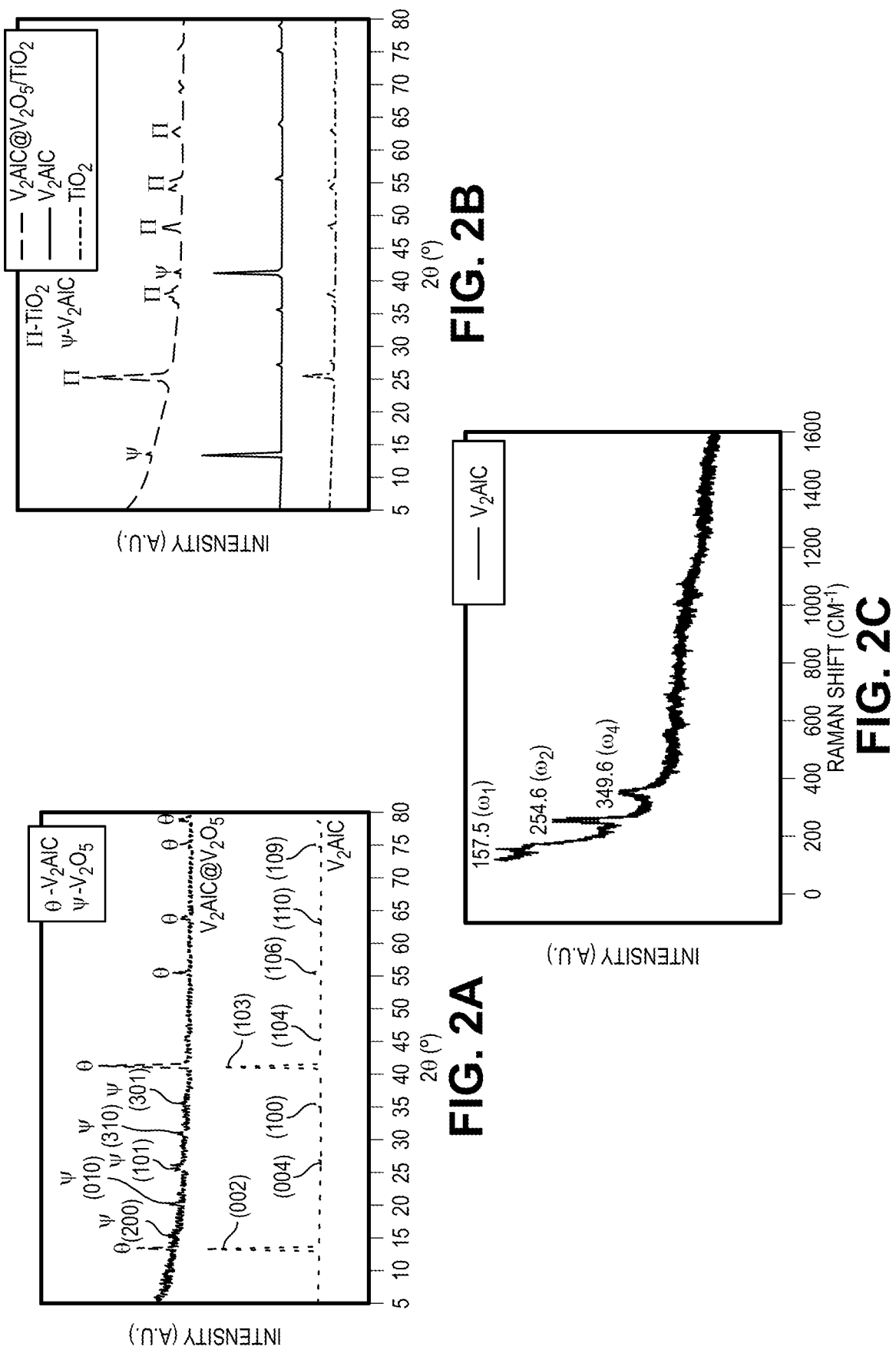

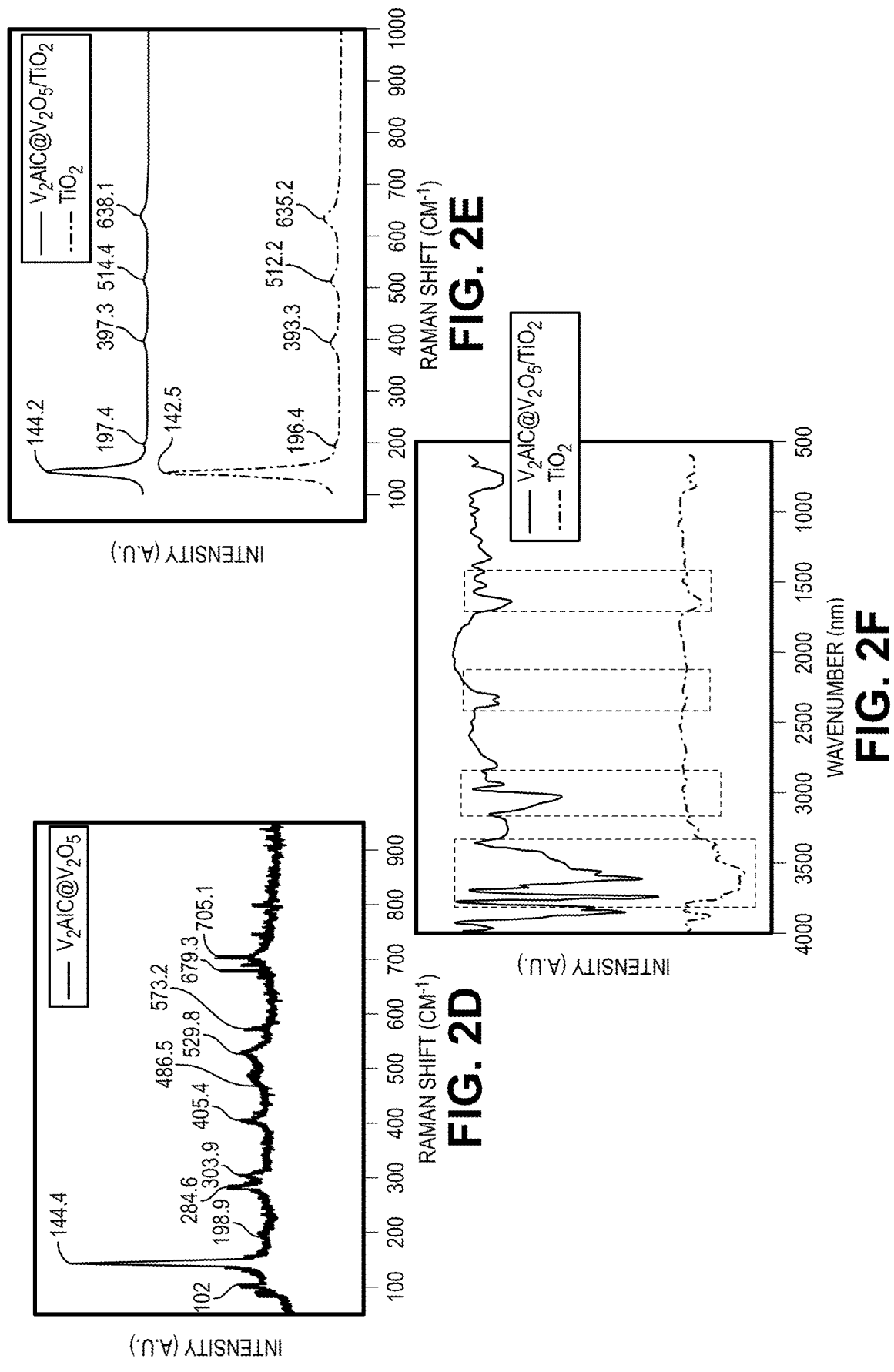

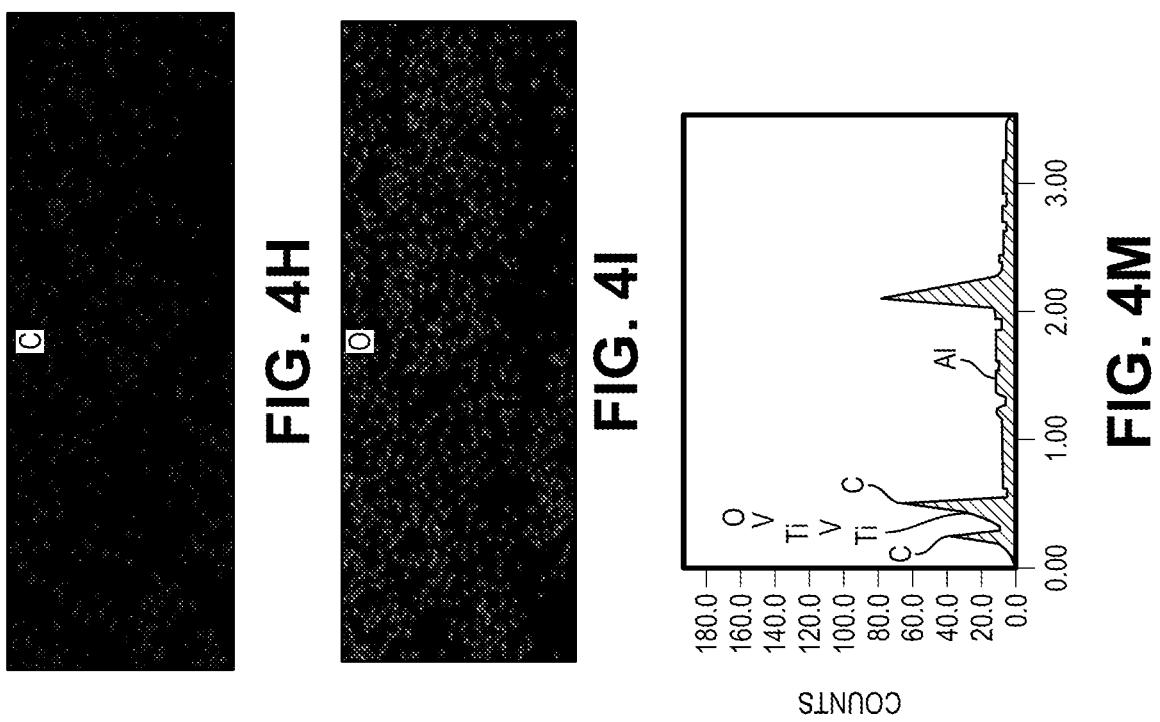
FIG. 4H
FIG. 4I
FIG. 4M
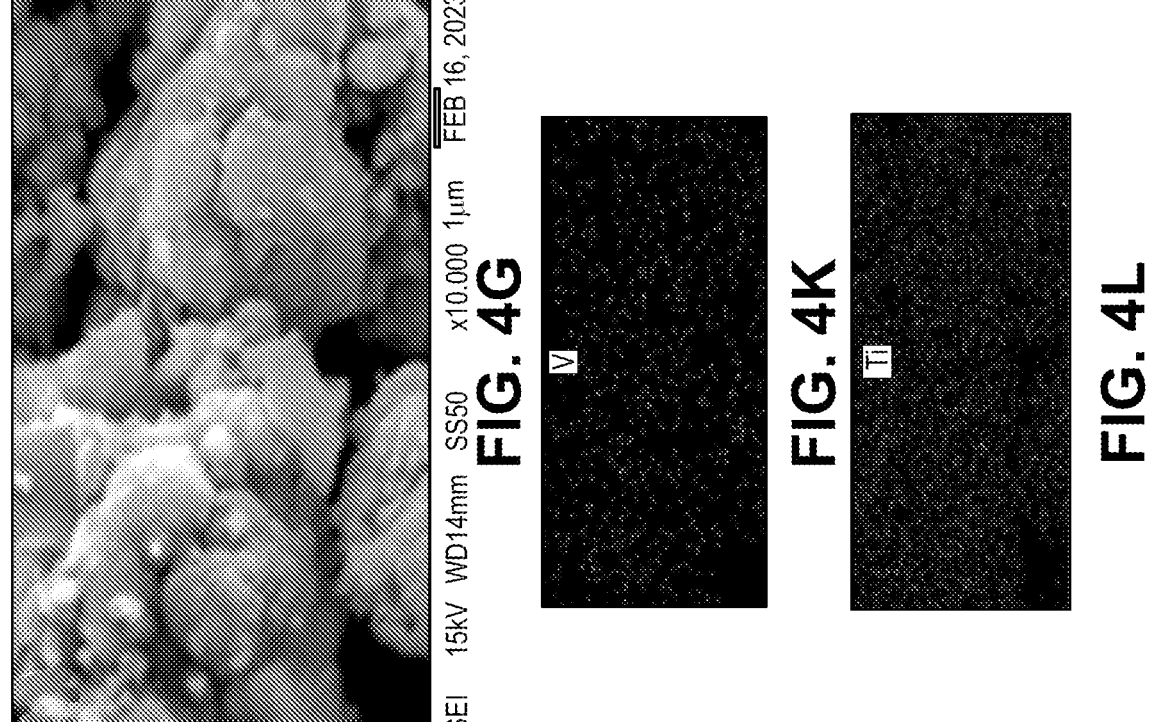
FIG. 4G
FIG. 4K
FIG. 4L

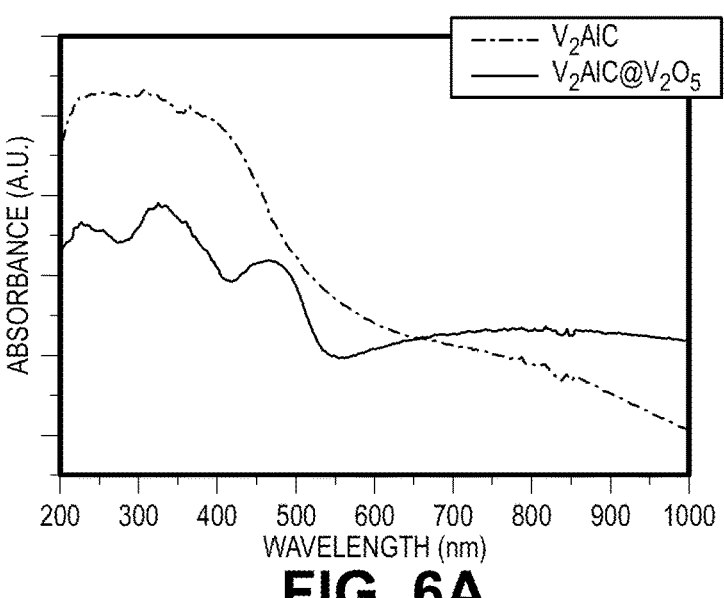
FIG. 6A
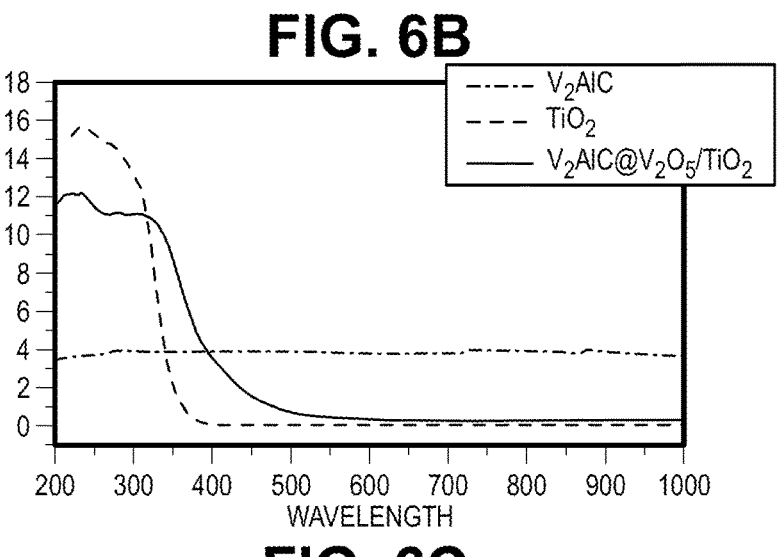
FIG. 6B
FIG. 6C

$V_2AlC@V_2O_5/TiO_2$ HETEROJUNCTION COMPOSITE PHOTOCATALYST, PREPARATION METHOD, AND APPLICATION THEREOF

TECHNICAL FIELD

The present disclosure relates to the field of composite photocatalysts and the preparation methods thereof. In particular, the present disclosure relates to a $V_2AlC@V_2O_5/TiO_2$ heterojunction composite photocatalyst and a preparation method and application thereof.

BACKGROUND OF THE DISCLOSURE

Carbon dioxide ($CO_2$), a prominent greenhouse gas, significantly contributes to climate change by trapping heat in the atmosphere, leading to global warming and associated environmental disruptions. Human activities, including the combustion of fossil fuels (coal and natural gas) for energy, industrial processes, deforestation, and certain agricultural practices, are the primary sources of $CO_2$ emissions. However, existing semiconductor-based photocatalytic systems often exhibit low efficiency in harnessing solar energy, resulting in suboptimal yields of desired products. Enhancing the efficiency of light absorption, charge separation, and catalytic activity of semiconductors is crucial to improve overall process efficiency.

The conversion of $CO_2$ into valuable chemicals and fuels through photocatalytic processes offers a promising solution. Photocatalytic $CO_2$ reduction (PCR) involves the use of a semiconductor and source of energy (light) to produce methane, methanol, carbon monoxide, acetic acid and formic acid. Different photocatalysts, such as $TiO_2$, ZnO, MOF, $g-C_3N_4$ and $WO_3$, were investigated for these PCR reactions due to their unique properties.

To increase $TiO_2$ photoactivity, researchers have explored methods such as loading metals, using cocatalysts, and creating heterojunctions with other semiconductors [1, 2]. Several metals loaded with $TiO_2$ have been reported to enhance $CO_2$ reduction efficiency through improved charge carrier separation and higher light absorption [3]. For example, Au—CoO-loaded $TiO_2$ was tested for $CO_2$ reduction by producing selective CO and $CH_4$ [4]. Similarly, $CO_2$ reduction to $CH_4$ over $Cu/TiO_2$ and $PV—TiO_2$ has been achieved [5, 6]. Regarding heterojunctions, ternary $WO_3$—$TiO_2/Cu_2ZnSnS_4$ composite with improved $CO_2$ reduction [7] and improved $CO_2$ photoreduction to produce $CH_4$ over $CdS/TiO_2$ [8] have been investigated.

MAX materials, characterized by their layered structure and unique properties, have also garnered attention for photocatalytic applications. The MAX materials are made of three elements with a layered structure and compact sheets. These elements include transition metals (M element), elements of group III or IV (A element), and either C or N elements (X element). In light of this, MAX has the general formula $M_{n+1}AX_n$, where n can either be 1 or 3 and belongs to the family of carbides or nitrides [9, 10]. During the previous years, several classes of MAX materials are under exploration, namely $Ti_3AlC_2$, $V_2AlC$, $Nb_2AlC$, $Ti_2AN$, and others [11]. MAX and MXene structures, due to their several distinguishing characteristics such as high conductivity, charge carrier transport ability, low cost, and better stability, have drawn the attention of numerous researchers [12]. Previously, titanium aluminum carbide ($Ti_3AlC_2$) MAX was tested in photocatalytic applications and found promising in $CO_2$ reduction applications. For example, when $Ti_3AlC_2$ was coupled with $TiO_2$, $CO_2$ reduction was achieved for the production of synthesis gas during dry reforming of methane [13, 14]. Similarly, MAX-phase $Ti_3AlC_2$ was used to enhance the hydrogen storage capabilities of $MgH_2$ [15]. Recently, $Ti_3AlC_2$ was supported with $TiO_2/Ni_2P$ for photocatalytic water splitting with effective hydrogen production.

However, known catalysts suffer from drawbacks such as limited efficiency, reduced photostability, and shorter catalytic activity. Some may exhibit instability or deactivation over time, leading to decreased performance and requiring frequent replacement or regeneration. Additionally, some may have narrow application ranges or limited versatility, thereby limiting their effectiveness in different photocatalytic processes. Furthermore, certain catalysts may be susceptible to side reactions or produce undesired by-products, which can impact the purity and yield of the desired chemicals or fuels.

Therefore, there is a need to address the one or more limitations associated with existing catalysts used in the photocatalytic processes of $CO_2$ reduction.

SUMMARY OF THE DISCLOSURE

Accordingly, provided herein is a composite photocatalyst comprising $V_2AlC@V_2O_5/TiO_2$ heterojunction, wherein $V_2AlC$ is from about 1 to about 20 wt. %; $V_2O_5$ is from about 1 to about 5 wt. %; and $TiO_2$ is from about 60 to about 99 wt. %. In an aspect, the composite is a supported composite or an unsupported composite. This composite photocatalyst addresses one or more limitations associated with existing catalysts used in the photocatalytic processes of $CO_2$ reduction.

In another aspect, the present disclosure provides a process for preparing a composite comprising $V_2AlC@V_2O_5/TiO_2$. The process comprises the steps of:

a) mixing a titanium precursor and an alcohol solvent, and stirring to obtain a first solution;

b) mixing an acid with an alcohol solvent, and stirring to form a second solution;

c) mixing the second solution and the first solution, and stirring to obtain a third solution;

d) dispersing $V_2AlC$ in the alcohol solvent;

e) adding the dispersed $V_2AlC$ to the third solution to get a suspension, and stirring the suspension for a predetermined period;

f) drying the suspension to obtain a dried product;

g) grinding the dried product into fine powder; and h) calcining the ground product at about 450-550° C. for about 2-4 h to obtain the composite comprising $V_2AlC@V_2O_5/TiO_2$.

In yet another aspect, the present disclosure provides a composite photocatalyst comprising $V_2AlC@V_2O_5/TiO_2$ heterojunction prepared by the process of the preceding aspect.

The present disclosure further provides a process for $CO_2$ reduction. The process comprises contacting a feed comprising $CO_2$ and at least one sacrificial compound with a composite photocatalyst comprising $V_2AlC@V_2O_5/TiO_2$ heterojunction in a photoreactor system; and irradiating the photocatalyst with at least one irradiation source; wherein the composite is a supported composite or an unsupported composite.

The present disclosure also provides the use of a composite photocatalyst comprising $V_2AlC@V_2O_5/TiO_2$ heterojunction for photocatalytic $CO_2$ reduction.

BRIEF DESCRIPTION OF THE ACCOMPANYING FIGURES

In order that the disclosure may be readily understood and put into practical effect, reference will now be made to exemplary embodiments as illustrated with reference to the accompanying figures. The figures together with detailed description below, are incorporated in and form part of the specification, and serve to further illustrate the embodiments and explain various principles and advantages, in accordance with the present disclosure where:

FIGS. 2A-2F illustrate: FIG. 2A XRD patterns of $V_2AlC$ and $V_2AlC@V_2O_5$, FIG. 2B XRD patterns of $TiO_2$, and $V_2AlC@V_2O_5/TiO_2$ composite samples, FIG. 2C Raman spectra of $V_2AlC$, FIG. 2D Raman spectra of $V_2AlC@V_2O_5$, FIG. 2E Raman spectra of $V_2AlC@V_2O_5/TiO_2$, FIG. 2F FTIR spectra of $TiO_2$ and $V_2AlC@V_2O_5/TiO_2$ composite.

FIGS. 3A-3B SEM images of $V_2AlC$, FIGS. 3C-3D SEM images of $V_2AlC@V_2O_5$, FIG. 3E SEM images of $TiO_2$, FIG. 3F SEM images of $TiO_2$ produced by sol-gel, FIGS. 3G-3H SEM images of $V_2AlC/TiO_2$ produced by physical mixing FIGS. 3I-3K SEM images of $V_2AlC@V_2O_5/TiO_2$ composite produced by sol-gel method.

FIGS. 4A-4M illustrate: FIGS. 4A-4F EDS mapping analysis of $V_2AlC@V_2O_5$; FIGS. 4G-4M EDX mapping analysis of $V_2ALC@V_2O_5/TiO_2$ composite.

Figure 6D:
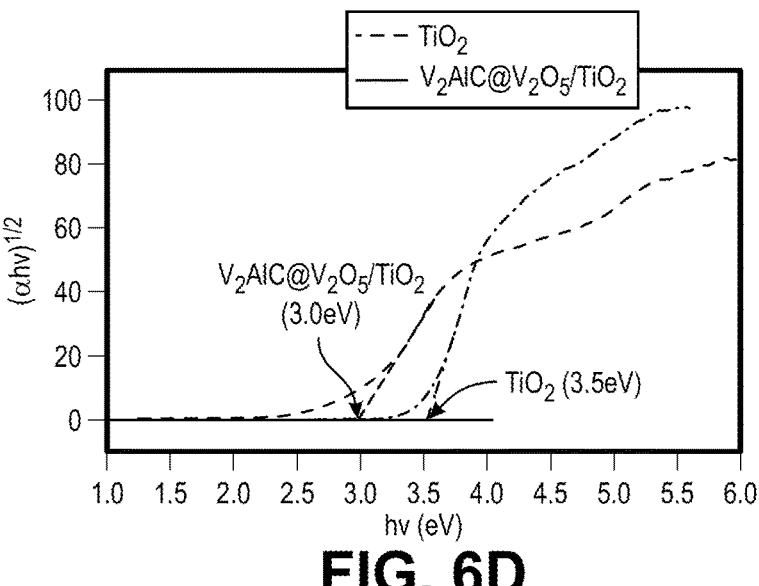
Figure 6E:
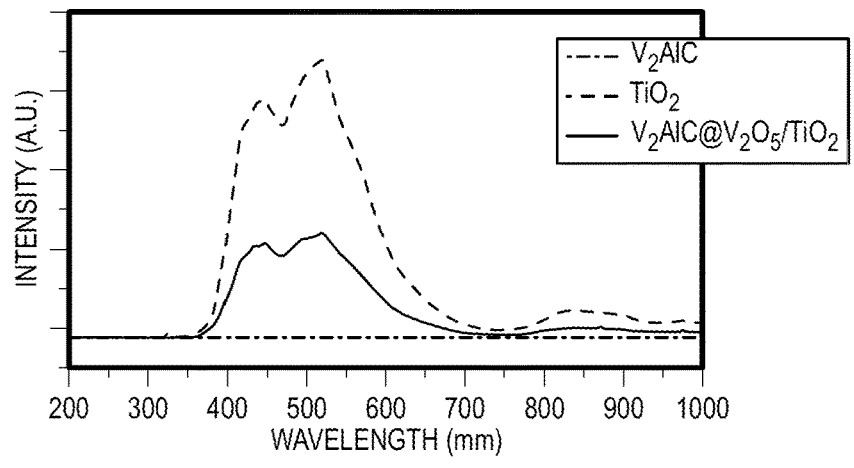
Figure 6F:
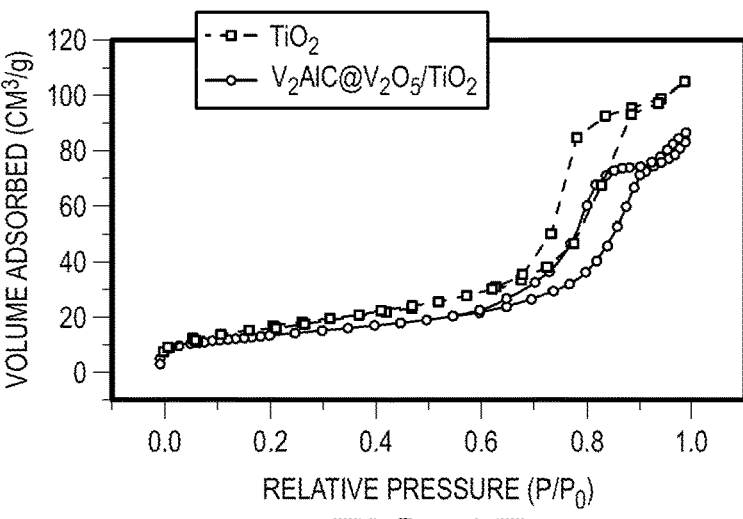

FIGS. 6A-6F illustrate UV-visible diffuse reflectance (DRS) absorbance spectra of $TiO_2$, $V_2AlC$, $V_2AlC@V_2O_5$ and $V_2AlC@V_2O_5/TiO_2$ composite as follows: FIG. 6A UV-Vis DRS of $V_2AlC$ and $V_2AlC@V_2O_5$ samples, FIG. 6B Light emission pattern of $V_2AlC@V_2O_5$ produced after 532 nm laser light excitation, FIG. 6C UV-Vis DRS of $V_2AlC$, $TiO_2$ and $V_2AlC@V_2O_5/TiO_2$ composite samples, FIG. 6D Tauc plot for $TiO_2$ and $V_2AlC@V_2O_5/TiO_2$ samples, FIG. 6E PL spectra of $V_2AlC$, $TiO_2$ and $V_2AlC@V_2O_5/TiO_2$ composite samples, FIG. 6F $N_2$ adsorption/desorption isotherms of $TiO_2$ and $V_2AlC@V_2O_5/TiO_2$ composite.

Figure 7A:
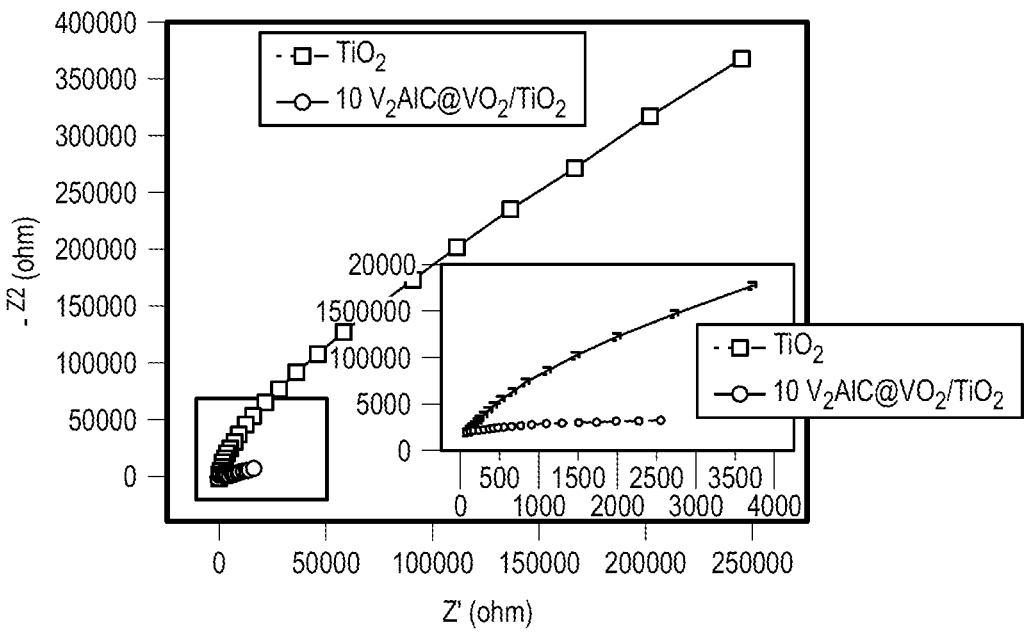
Figure 7B:
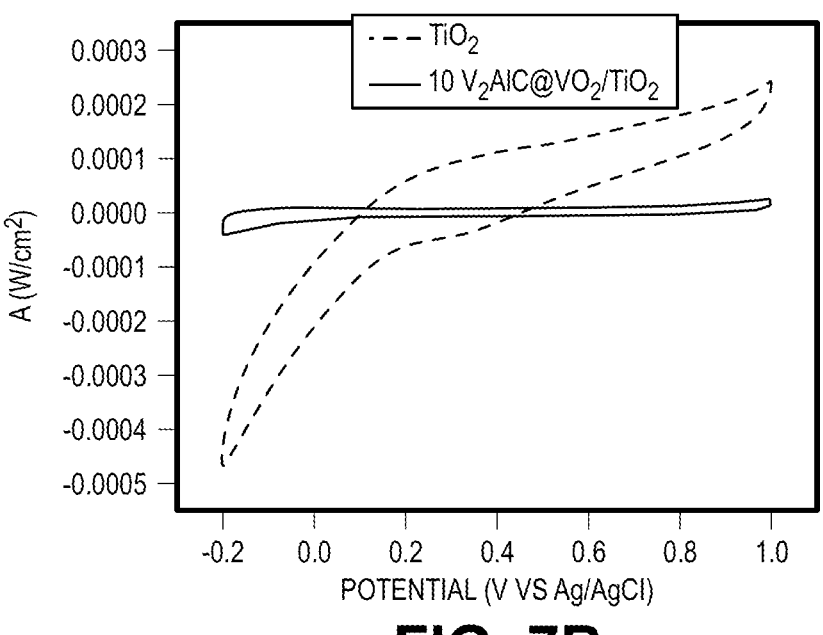

FIGS. 7A-7B illustrate: FIG. 7A EIS Nyquist plot of pure $TiO_2$ and $V_2AlC@V_2O_5/TiO_2$ composites, FIG. 7B Cyclic voltammetry analysis $TiO_2$ and $V_2AlC@V_2O_5/TiO_2$ composites.

Figures 8A, 8B, 8C:
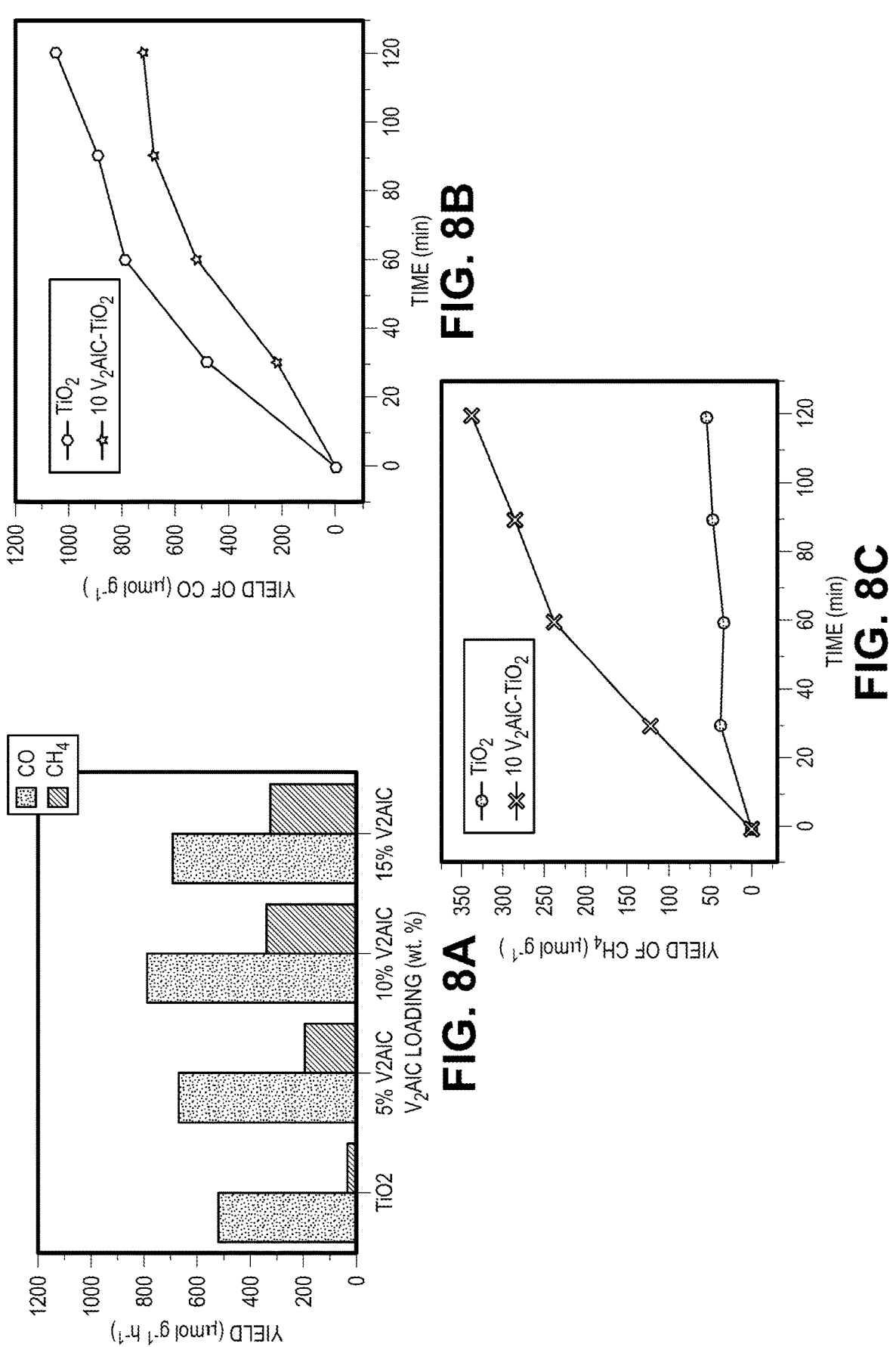
Figure 8D:
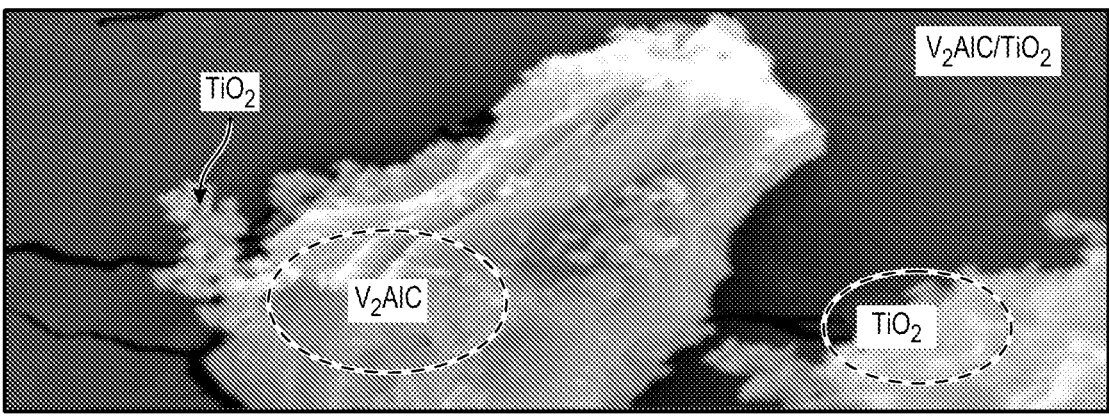
Figure 8E:
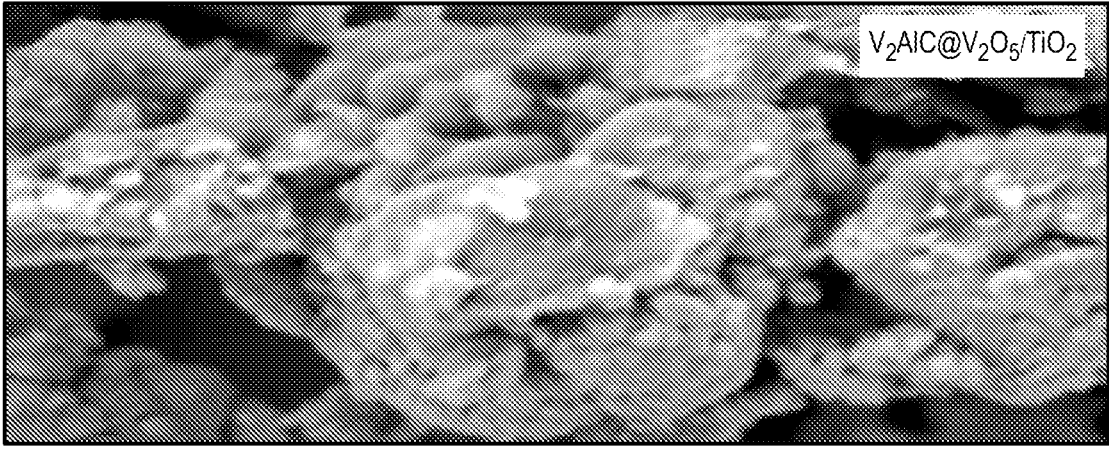
Figure 8F:
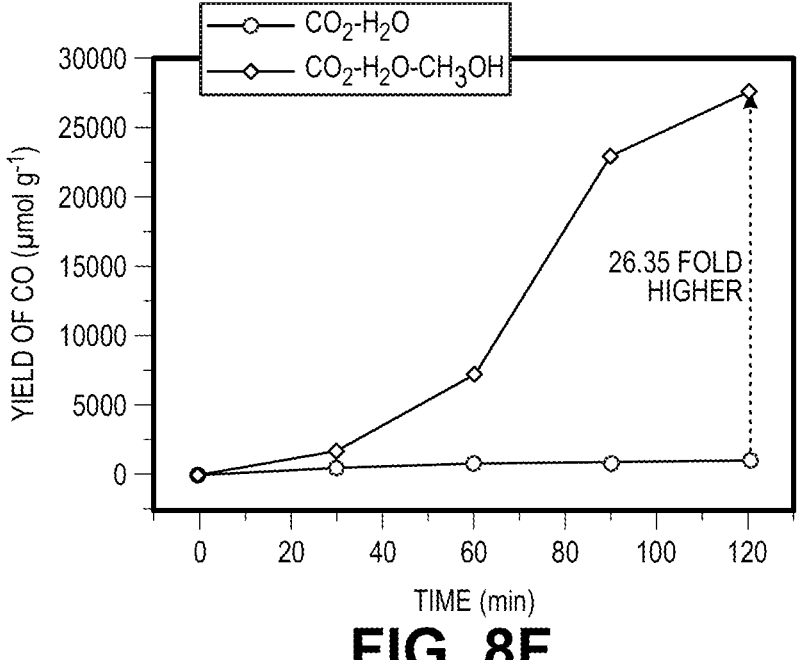
Figure 8G:
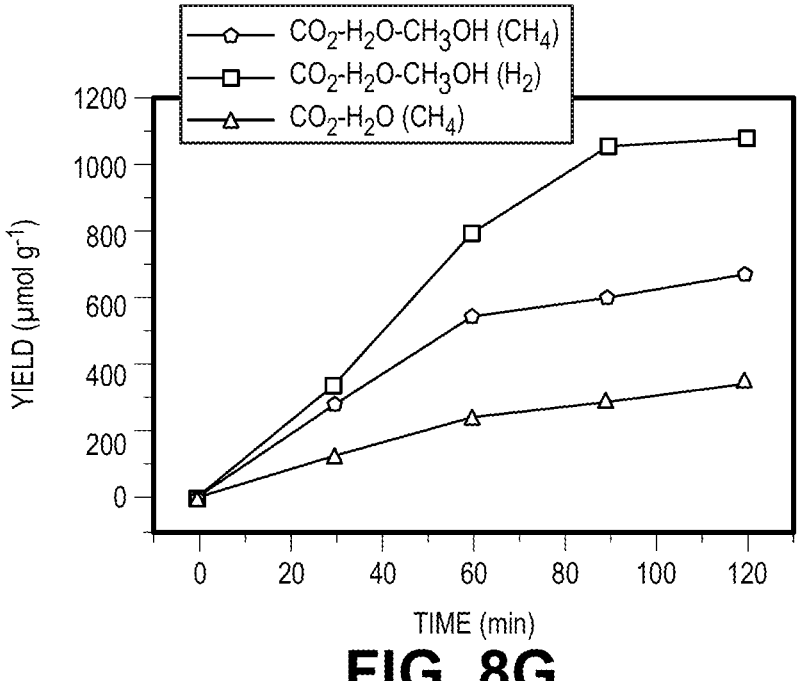

FIGS. 8A-8G illustrate: FIG. 8A Effect of $V_2AlC@V_2O_5$ loading on $TiO_2$ performance in a fixed bed reactor for photocatalytic $CO_2$ reduction with water. Effect of irradiation time on FIG. 8B CO production, FIG. 8C $CH_4$ production. FIGS. 8D-8E performance analysis of physical mixing and sol-gel approach for materials synthesis. Performance comparison of $V_2AlC@V_2O_5/TiO_2$ composite for photocatalytic $CO_2$ reduction through b-reforming for FIG. 8F CO production, FIG. 8G $CH_4$ and $H_2$ production.

Figure 9A:
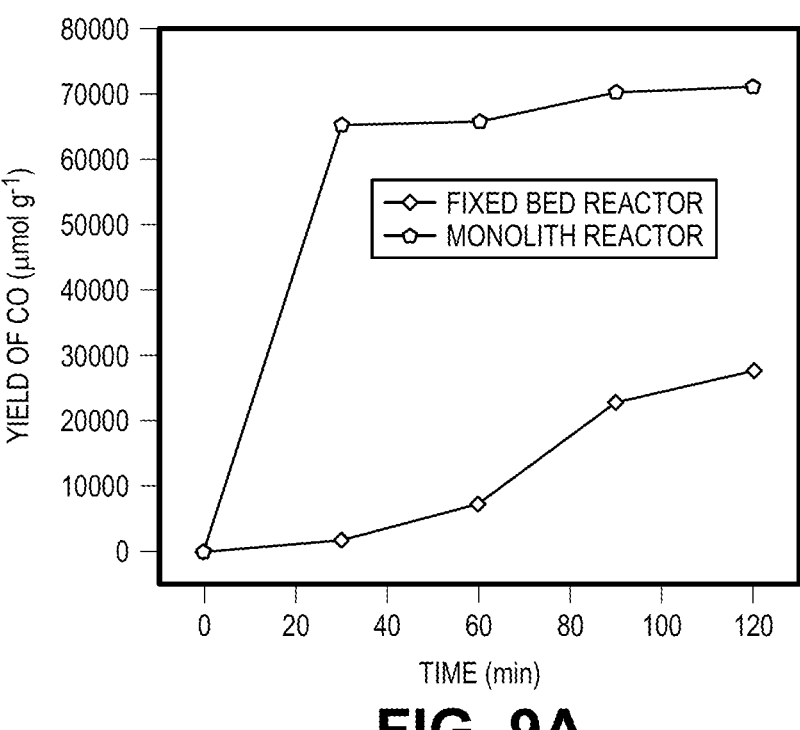
Figure 9B:
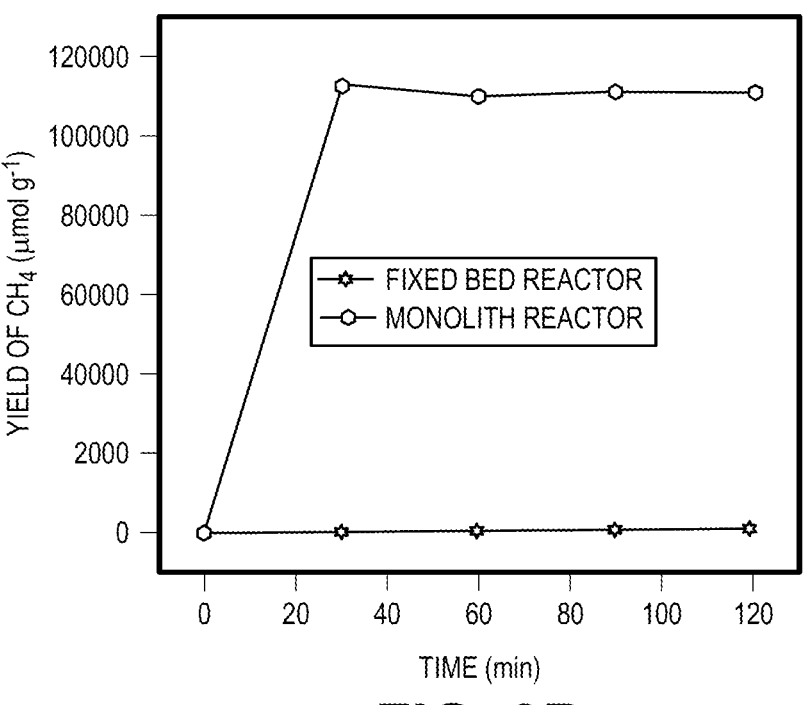
Figure 9C:
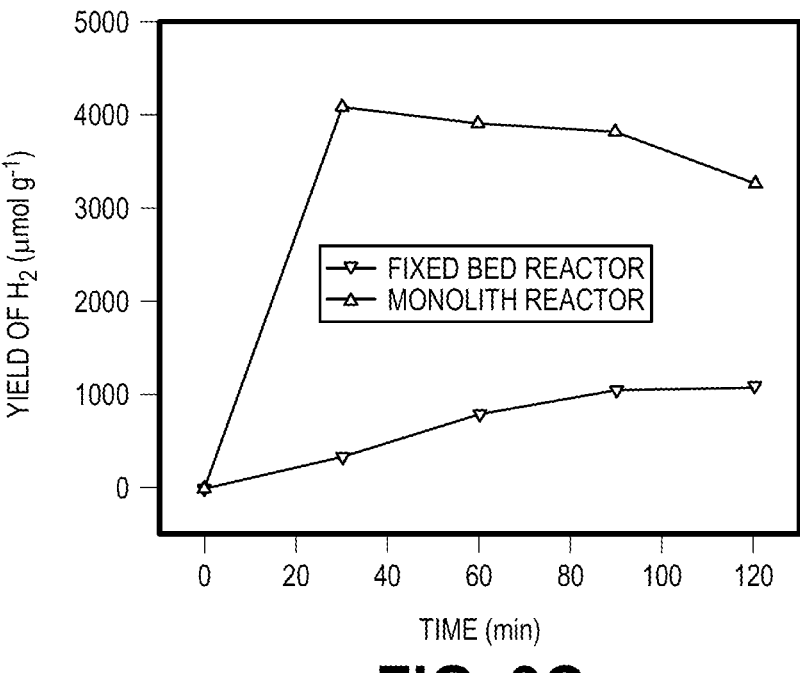
Figure 9D:
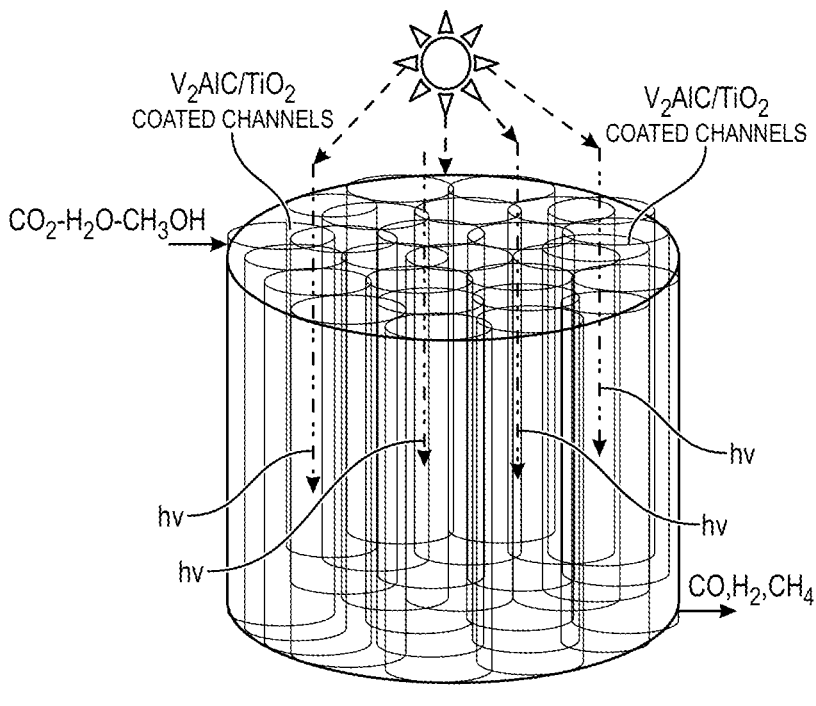

FIGS. 9A-9D illustrate performance comparison of fixed bed and monolith photoreactor for photocatalytic $CO_2$ reduction with methanol-water mixture over $V_2AlC@V_2O_5/TiO_2$ composite for FIG. 9A CO yield, FIG. 9B $CH_4$ yield FIG. 9C $H_2$ yield FIG. 9D Schematic illustration of monolithic channels for higher efficiency.

Figure 10A:
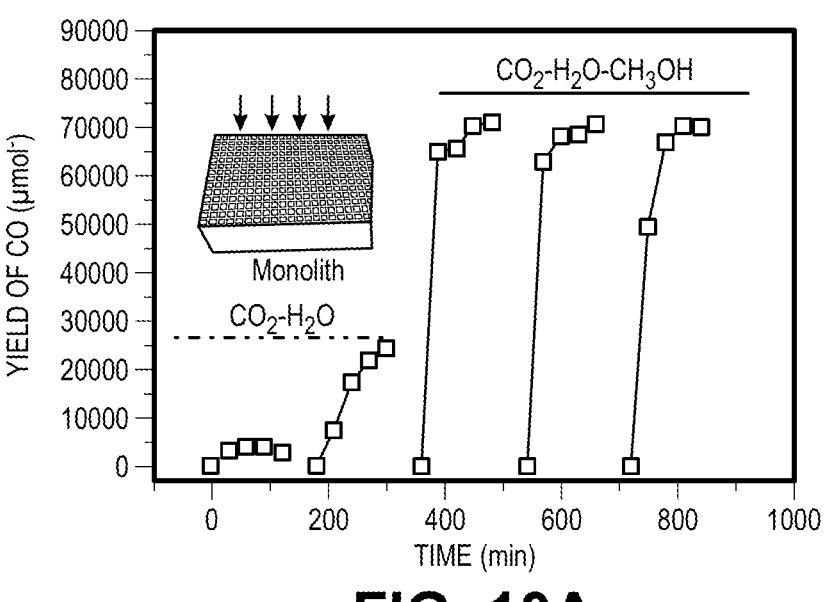
Figure 10B:
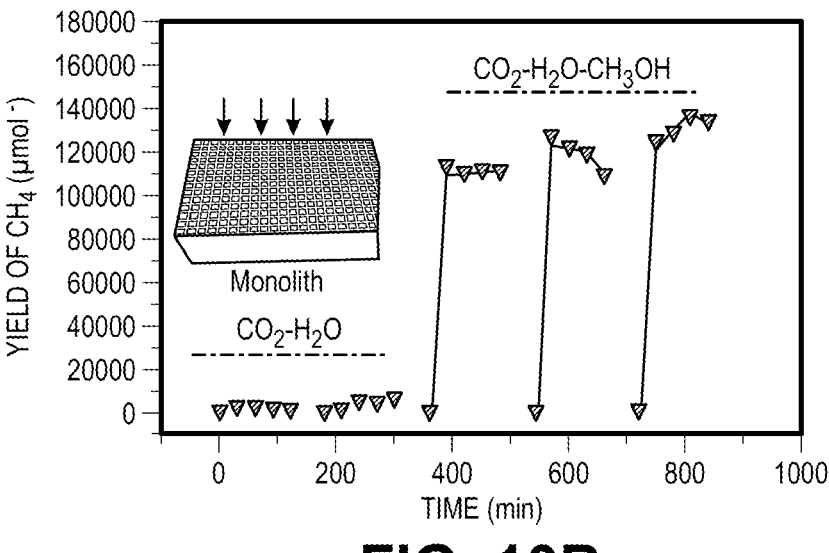
Figure 10C:
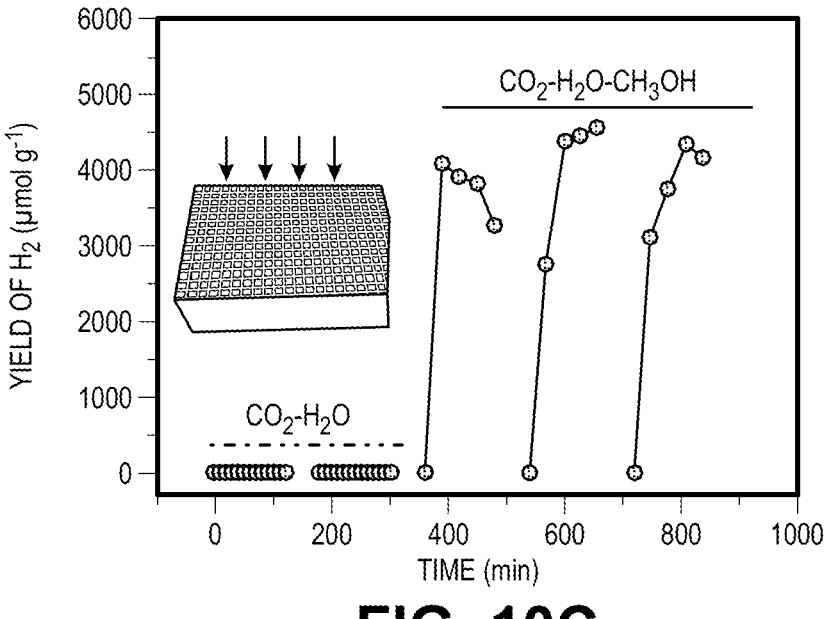

FIGS. 10A-10C illustrate cyclic assessment of $V_2AlC@V_2O_5/TiO_2$ in a monolith photoreactor for photocatalytic $CO_2$ reduction through bi-reforming of methanol for FIG. 10A CO yield, FIG. 10B $CH_4$ yield and FIG. 10C $H_2$ yield.

Figure 11:
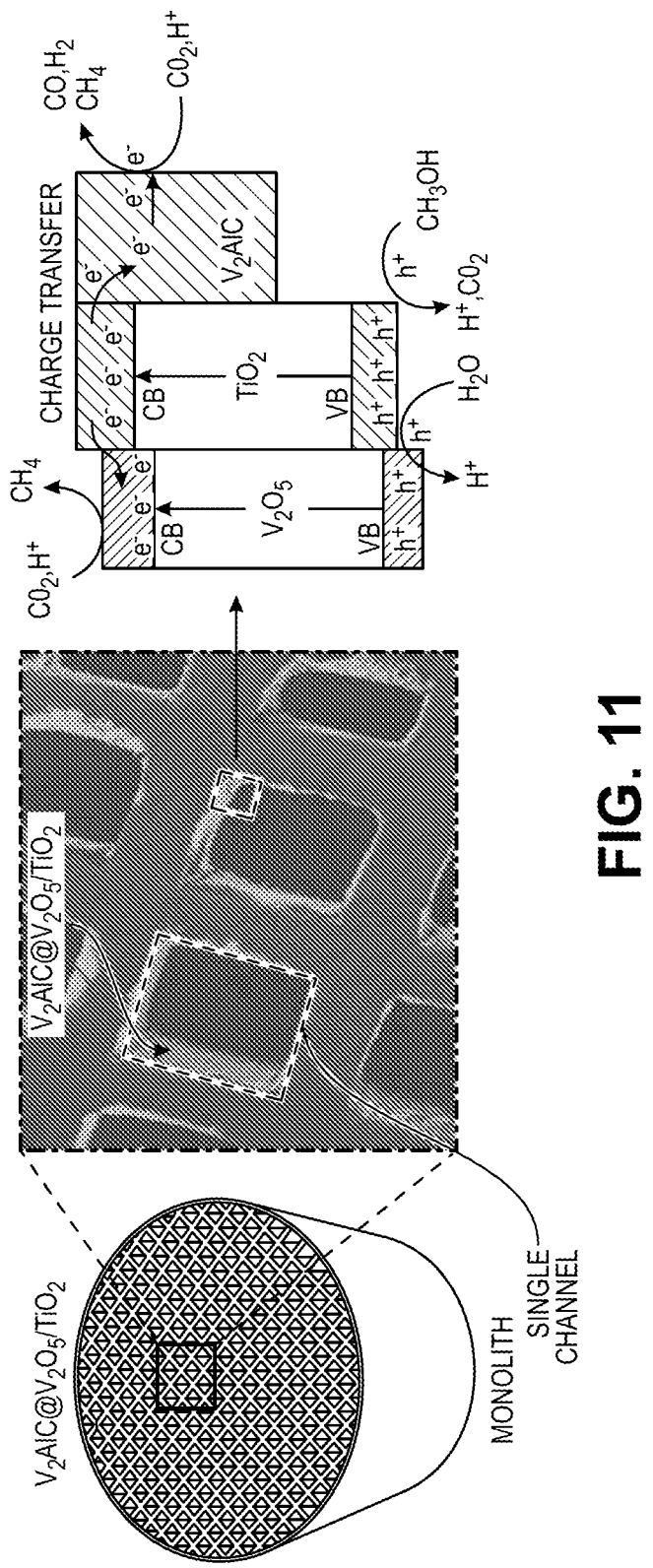

FIG. 11 shows a schematic illustration for photocatalytic $CO_2$ reduction with water/methanol mixture over $V_2AlC@V_2O_5/TiO_2$ in a monolith photoreactor to produce CO, $CH_4$ and $H_2$ under UV-light irradiation.

DETAILED DESCRIPTION OF THE DISCLOSURE

The present disclosure is directed to $V_2AlC@V_2O_5/TiO_2$ heterojunction composite photocatalyst, preparation method, and application thereof. The composite is a supported composite or an unsupported composite. This composite photocatalyst addresses one or more limitations associated with existing catalysts used in the photocatalytic processes of $CO_2$ reduction.

In an embodiment, a cost-effective and efficient carbon-based material with honeycomb structured composites for photocatalytic $CO_2$ reduction to solar fuels is provided in the present disclosure. This involves synthesizing a composite using a method that facilitates the conversion of $CO_2$ through reforming systems under solar energy. Specifically, a 2D layered structure of vanadium aluminum carbide (2D $V_2AlC$) MAX with in-situ grown $V_2O_5$ to construct $V_2AlC@V_2O_5$ is developed through a facile single-step hydrothermal method. Further, the layered structure material is adorned with titanium dioxide nanoparticles, and the entire composite is immobilized with a honeycomb structure to create $V_2AlC@V_2O_5/TiO_2$ honeycomb composite. A comparative study between fixed bed and honeycomb photoreactors was conducted using the invented composite, evaluating their performance for photocatalytic $CO_2$ reduction to solar fuels. The partial oxidation of $V_2AlC$ for heating at a lower temperature can produce $V_2O_5$ over its surface to get $V_2AlC@V_2O_5$ nanotexture. Coupling $V_2O_5$ with $V_2AlC/TiO_2$ to construct $V_2AlC@V_2O_5/TiO_2$ can stimulate charge separation efficiency to maximize photocatalytic $CO_2$ reduction efficiency.

The present disclosure can be understood more readily by reference to the following description taken in connection with the accompanying Figures and Examples, all of which form a part of this disclosure.

At the very outset of the detailed description, it may be understood that the ensuing description only illustrates a particular form of this invention. However, such a particular form is only an exemplary embodiment, and without intending to imply any limitation on the scope of this invention. Accordingly, the description is to be understood as an exemplary embodiment and teaching of invention and not intended to be taken restrictively.

Before the present disclosure or methods of the present disclosure are described in greater detail, it is to be understood that the specific products, methods, processes, conditions or parameters, are not limited to particular embodiments described, as such may, of course, vary. It is also to be understood that the terminology used herein is for the purpose of describing particular embodiments only, and is not intended to be limiting, since the scope of the methods will be limited only by the appended claims.

Where a range of values is provided, it is understood that each intervening value, to the tenth of the unit of the lower limit unless the context dictates otherwise, between the upper and lower limit of that range and any other stated or intervening value in that stated range, is encompassed within the methods. The upper and lower limits of these smaller ranges may independently be included in the smaller ranges and are also encompassed within the methods, subject to any specifically excluded limit in the stated range. Where the stated range includes one or both of the limits, ranges excluding either or both of those included limits are also included in the methods.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number. For example, "about" can mean within one or more standard deviations, or within ±30%, 25%, 20%, 15%, 10% or 5% of the stated value.

Unless defined otherwise, all technical and scientific terms used herein have the same meaning as commonly understood by those of ordinary skill in the art to which the invention belongs. Although any methods and materials similar or equivalent to those described herein can be used in the practice or testing of the present invention, preferred methods and materials are described. For the purposes of the present invention, the following terms are defined below.

All publications cited in this specification are herein incorporated by reference as if each individual publication was specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present products, composites or methods are not entitled to antedate such publication by virtue of prior invention.

It is appreciated that certain features of the methods, which are, for clarity, described in the context of separate embodiments, may also be provided in combination in a single embodiment. Conversely, various features of the methods, which are, for brevity, described in the context of a single embodiment, may also be provided separately or in any suitable sub-combination. All combinations of the embodiments are specifically embraced by the present invention and are disclosed herein just as if each and every combination was individually and explicitly disclosed, to the extent that such combinations embrace operable processes and/or composites/scaffolds. In addition, all sub-combinations listed in the embodiments describing such variables are also specifically embraced by the present methods and are disclosed herein just as if each and every such sub-combination was individually and explicitly disclosed herein.

As will be apparent to those of skill in the art upon reading this disclosure, each of the individual embodiments described and illustrated herein has discrete components and features which may be readily separated from or combined with the features of any of the other several embodiments without departing from the scope or spirit of the present methods. Any recited method can be carried out in the order of events recited or in any other order which is logically possible.

The articles "a" and "an" are used herein to refer to one or to more than one (i.e., to at least one) of the grammatical object of the article. By way of example, "an element" means one element or more than one element.

As used herein, the term "comprises", "comprising", or "comprising of" is generally used in the sense of include, that is to say permitting the presence of one or more features or components. The term "comprises", "comprising", or "comprising of" when placed before the recitation of steps in a process or method means that the process or method encompasses one or more steps that are additional to those expressly recited, and that the additional one or more steps may be performed before, between, and/or after the recited steps. For example, a process or method comprising steps a, b, and c encompasses a process or method of steps a, b, x, and c, a method of steps a, b, c, and x, as well as a method of steps x, a, b, and c. Furthermore, the term "comprising" when placed before the recitation of steps in a method does not (although it may) require sequential performance of the listed steps, unless the content clearly dictates otherwise. For example, a process or a method comprising steps a, b, and c encompasses, for example, a process or a method of performing steps in the order of steps a, c, and b, the order of steps c, b, and a, and the order of steps c, a, and b, etc.

Reference throughout this specification to "certain embodiments", "further embodiments", "some embodiments", "one embodiment", "an embodiment", "a non-limiting embodiment", "an exemplary embodiment", "some instances", or "further instances", means that a particular feature, structure or characteristic described in connection with the embodiment may be included in at least one embodiment of the present disclosure. Thus, the appearances of the "certain embodiments", "further embodiments", "some embodiments", "one embodiment", "an embodiment", "a non-limiting embodiment", "an exemplary embodiment", "some instances", or "further instances", in various places throughout this specification may not necessarily all refer to the same embodiment. It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination.

As used herein, the terms 'include', 'have', 'comprise', 'contain' etc. or any form of said terms such as 'having', 'including', 'containing', 'comprising' or 'comprises' are inclusive and will be understood to imply the inclusion of a stated element, integer or step, or group of elements, integers or steps, but not the exclusion of any other element, integer or step, or group of elements, integers or steps.

The use of any and all examples, or exemplary language (e.g., "such as") provided with respect to certain embodiments herein is intended merely to better illustrate the disclosure and does not pose a limitation on the scope of the disclosure otherwise claimed.

As regards the embodiments characterized in this specification, it is intended that each embodiment be read independently as well as in combination with another embodiment. For instance, in case of an embodiment 1 reciting 3 alternatives A, B and C, an embodiment 2 reciting 3 alternatives D, E and F and an embodiment 3 reciting 3 alternatives G, H and I, it is to be understood that the specification unambiguously discloses embodiments corresponding to combinations A, D, G; A, D, H; A, D, I; A, E, G; A, E, H; A, E, I; A, F, G; A, F, H; A, F, I; B, D, G; B, D, H; B, D, I; B, E, G; B, E, H; B, E, I; B, F, G; B, F, H; B, F, I; C, D, G; C, D, H; C, D, I; C, E, G; C, E, H; C, E, I; C, F, G; C, F, H; C, F, I, unless specifically mentioned otherwise.

As used herein, the term "invention", "present invention", "disclosure" or "present disclosure" as used herein is a non-limiting term and is not intended to refer to any single embodiment of the particular invention but encompasses all possible embodiments as described in the specification.

The terms "process(es)" and "method(s)" are considered interchangeable within this disclosure.

In an embodiment, the present disclosure provides a composite photocatalyst comprising $V_2AlC@V_2O_5/TiO_2$ heterojunction; wherein $V_2AlC$ is from about 1 to about 20 wt. %; $V_2O_5$ is from about 0 to about 10 wt. %; and $TiO_2$ is from about 60 to about 99 wt. %.

In certain embodiments, the present disclosure provides a composite photocatalyst comprising $V_2AlC@V_2O_5/TiO_2$ heterojunction; wherein $V_2AlC$ is from about 5 to about 20 wt. %; $V_2O_5$ is from about 1 to about 3 wt. %; and $TiO_2$ is from about 75 to about 95 wt. %.

In certain embodiments, $V_2AlC$ is from about 1 to about 5 wt. %; $V_2O_5$ is from about 0 to about 0.5 wt. %; and $TiO_2$ is from about 95 to about 99 wt. %. In some embodiments, $V_2AlC$ is from about 5 to about 15 wt. %; $V_2O_5$ is from about 3 to about 10 wt. %; and $TiO_2$ is from about 60 to about 90 wt. %.

In certain embodiments, $V_2AlC$ may present in about 1 wt. %, about 2 wt. %, about 3 wt. %, about 4 wt. %, about 5 wt. %, about 6 wt. %, about 7 wt. %, about 8 wt. %, about 9 wt. %, about 10 wt. %, about 11 wt. %, about 12 wt. %, about 13 wt. %, about 14 wt. %, about 15 wt. %, about 16 wt. %, about 17 wt. %, about 18 wt. %, about 19 wt. %, or about 20 wt. %.

In certain embodiments, $V_2O_5$ may present in about 0.01 wt. %, about 0.5 wt. %, about 1.0 wt. %, about 1.5 wt. %, about 2.0 wt. %, about 2.5 wt. %, about 3.0 wt. %, about 3.5 wt. %, about 4.0 wt. %, about 4.5 wt. %, about 5.0 wt. %, about 5.5 wt. %, about 6.0 wt. %, about 6.5 wt. %, about 7.0 wt. %, about 7.5 wt. %, about 8.0 wt. %, about 8.5 wt. %, about 9.0 wt. %, about 9.5 wt. %, or about 10.0 wt. %.

In certain embodiments, $TiO_2$ may present in about 60 wt. %, about 61 wt. %, about 62 wt. %, about 63 wt. %, about 64 wt. %, about 65 wt. %, about 66 wt. %, about 67 wt. %, about 68 wt. %, about 69 wt. %, about 70 wt. %, about 71 wt. %, about 72 wt. %, about 73 wt. %, about 74 wt. %, about 75 wt. %, about 76 wt. %, about 77 wt. %, about 78 wt. %, about 79 wt. %, about 80 wt. %, about 81 wt. %, about 82 wt. %, about 83 wt. %, about 84 wt. %, about 85 wt. %, about 86 wt. %, about 87 wt. %, about 88 wt. %, about 89 wt. %, about 90 wt. %, about 91 wt. %, about 92 wt. %, about 93 wt. %, about 94 wt. %, about 95 wt. %, about 96 wt. %, about 97 wt. %, about 98 wt. %, or about 99 wt. %.

In certain embodiments, the $V_2AlC@V_2O_5/TiO_2$ composite has a BJH surface area of about 56.52 $m^2/g$.

Accordingly, in certain embodiments, the present disclosure provides a $V_2AlC@V_2O_5/TiO_2$ composite photocatalyst; wherein $V_2AlC@V_2O_5/TiO_2$ composite has a BJH surface area of about 56.52 $m^2/g$.

In certain embodiments, $TiO_2$ is distributed over the whole surface of $V_2AlC$ in the composite photocatalyst comprising $V_2AlC@V_2O_5/TiO_2$ heterojunction.

In certain embodiments, all the elements of the composite (V, Al, C, Ti and O) are evenly and/or uniformly distributed within the composite. In some embodiments, all the elements of the composite (V, Al, C, Ti and O) are evenly and uniformly distributed within the composite.

In certain embodiments, the composite photocatalyst comprises $V_2AlC$ with in-situ grown $V_2O_5$ coupled with $TiO_2$ to form $V_2AlC@V_2O_5/TiO_2$ heterojunction. In some embodiments, 2D $V_2AlC@V_2O_5$ is coupled with OD $TiO_2$. In some instances, the composite is 2D/OD $V_2AlC@V_2O_5$ with OD $TiO_2$ nanoparticles. Thus, in certain embodiments, the composite photocatalyst is ternary 2D/OD $V_2AlC@V_2O_5$ with OD $TiO_2$ NPs, which is either supported or unsupported.

In some embodiments, the composite photocatalyst is ternary 2D/OD $V_2AlC@V_2O_5$ with OD $TiO_2$ NPs immobilized over a support. In some instances, the composite photocatalyst is immobilized over the support through a simple and facile sol-gel dip coating method with higher loading efficiency and uniformity, resulting in higher solar energy harvesting efficiency.

Thus, in certain embodiments, the present disclosure provides a composite photocatalyst comprising $V_2AlC@V_2O_5/TiO_2$ heterojunction; wherein the composite photocatalyst comprises $V_2AlC$ with in-situ grown $V_2O_5$ coupled with $TiO_2$ to form $V_2AlC@V_2O_5/TiO_2$ heterojunction.

In certain embodiments, the composite photocatalyst comprising $V_2AlC@V_2O_5/TiO_2$ heterojunction is a supported composite or an unsupported composite.

In certain embodiments, the composite photocatalyst comprising $V_2AlC@V_2O_5/TiO_2$ heterojunction is a supported composite. The support may be composed of various materials, such as ceramic, metal, metal alloys, etc. In certain embodiments, the support is a monolithic support. A variety of shapes may be suitable for monolithic supports. These can include forms like honeycombs, foil, screens, plates, or a combination thereof. In certain embodiments, the support is a honeycomb support.

In certain embodiments, the support is a monolithic honeycomb support. The monolithic support's flow passages can vary in cross-sectional shape and size, including trapezoidal, rectangular, square, sinusoidal, hexagonal, elliptical, and circular, among others. These monolithic substrates may accommodate up to about 800 or more flow channels (or "cells") per square inch of cross-section. In certain embodiments, supports may contain about 50 to about 700 cells per square inch ("CPSI"), about 100 CPSI to about 600 CPSI, about 200 CPSI to about 500 CPSI, or about 200 CPSI to about 400 CPSI. In some instances, monoliths used are with 200 CPSI. These cells can exhibit a variety of cross-sectional shapes, such as rectangular, square, circular, oval, triangular, hexagonal, or other polygonal forms.

In certain embodiments, the support may be composed of a ceramic material. Non-limiting examples of ceramic materials include, $SiO_2$, $Al_2O_3$, MgO and others. In certain embodiments, the support may be composed of metal or metal alloys. Examples of metals include, but are not limited to steel, iron, copper, and others. Examples of metal alloys include, but are not limited to, Ni—Al, Al—Si, Fe—Al, Co—Ni—Cr, Ti—Ni—Cr and others.

Thus, in certain embodiments, the present disclosure provides a supported composite photocatalyst comprising $V_2AlC@V_2O_5/TiO_2$ heterojunction; wherein $V_2AlC$ is from about 1 to about 20 wt. %; $V_2O_5$ is from about 0 to about 10 wt. %; and $TiO_2$ is from about 60 to about 99 wt. %; and the support is a monolithic honeycomb support.

In certain embodiments, the supported composite is prepared by coating $V_2AlC@V_2O_5/TiO_2$ on a support. In some embodiments, the coating is done by a dip coating method. Accordingly, in some embodiments, the present disclosure provides a supported composite photocatalyst comprising $V_2AlC@V_2O_5/TiO_2$ heterojunction; wherein $V_2AlC$ is from about 1 to about 20 wt. %; $V_2O_5$ is from about 0 to about 10 wt. %; and $TiO_2$ is from about 60 to about 99 wt. %; and the supported composite is prepared by dip-coating method.

In certain embodiments, the composite is a nanocomposite. In some embodiments, the nanocomposite has a particle size of about 2 nm to about 50 nm. In further embodiments, the nanocomposite has a particle size of about 2 nm to about 10 nm. In some instances, the nanocomposite has a particle size of about 2 nm, about 3 nm, about 4 nm, about 5 nm, about 6 nm, about 7 nm, about 8 nm, about 9 nm, about 10 nm, about 11 nm, about 12 nm, about 13 nm, about 14 nm, about 15 nm, about 16 nm, about 17 nm, about 18 nm, about 19 nm, about 20 nm, about 21 nm, about 22 nm, about 23 nm, about 24 nm, about 25 nm, about 26 nm, about 27 nm, about 28 nm, about 29 nm, about 30 nm, about 31 nm, about 32 nm, about 33 nm, about 34 nm, about 35 nm, about 36 nm, about 37 nm, about 38 nm, about 39 nm, about 40 nm, about 41 nm, about 42 nm, about 43 nm, about 44 nm, about 45 nm, about 46 nm, about 47 nm, about 48 nm, about 49 nm, or about 50 nm.

Thus, in certain embodiments, the present disclosure provides a nanocomposite photocatalyst comprising $V_2AlC@V_2O_5/TiO_2$ heterojunction; wherein $V_2AlC$ is from about 1 to about 20 wt. %; $V_2O_5$ is from about 0 to about 10 wt. %; and $TiO_2$ is from about 60 to about 99 wt. %; and the nanocomposite photocatalyst comprises $V_2AlC$ with in-situ grown $V_2O_5$ coupled with $TiO_2$ to form $V_2AlC@V_2O_5/TiO_2$ heterojunction.

In certain embodiments, the nanocomposites are synthesized using single step sol-gel and nanomaterials are immobilized over the support using a dip-coating method.

Accordingly, in certain embodiments, the present disclosure provides a supported nanocomposite photocatalyst comprising $V_2AlC@V_2O_5/TiO_2$ heterojunction; wherein $V_2AlC$ is from about 1 to about 20 wt. %; $V_2O_5$ is from about 0 to about 10 wt. %; and $TiO_2$ is from about 60 to about 99 wt. %; the nanocomposite photocatalyst comprises $V_2AlC$ with in-situ grown $V_2O_5$ coupled with $TiO_2$ to form $V_2AlC@V_2O_5/TiO_2$ heterojunction; and the nanocomposite is coated on the support by sol-gel dip coating method.

In certain embodiments, $V_2AlC$ with in-situ grown $V_2O_5$ coupled with $TiO_2$ to construct $V_2AlC@V_2O_5/TiO_2$ heterojunction reduces $CO_2$ to selective chemicals and fuels in a photoreactor; wherein $V_2AlC$ MAX acts as a cocatalyst and $V_2O_5$ acts as a mediator.

Thus, in certain embodiments, the present disclosure provides a supported nanocomposite photocatalyst comprising $V_2AlC@V_2O_5/TiO_2$ heterojunction with $V_2AlC$ MAX as a cocatalyst and $V_2O_5$ as a mediator for photocatalytic $CO_2$ reduction to chemicals and fuels in a photoreactor. In certain embodiments, the present disclosure provides a $V_2AlC/TiO_2$ 2D/OD heterojunction with the direct use of $V_2AlC$ MAX as cocatalyst and $V_2O_5$ as the mediator for photocatalytic $CO_2$ reduction in a monolith photoreactor.

In certain embodiments, the present disclosure provides $V_2AlC@V_2O_5/TiO_2$ composite catalyst and its application in photocatalytic processes, particularly in the reduction of carbon dioxide ($CO_2$). The composite catalyst harnesses the synergistic effects of $V_2AlC@V_2O_5$ to enhance the photocatalytic performance for these reactions.

Accordingly, in certain embodiments, the present disclosure provides a use of a composite photocatalyst comprising $V_2AlC@V_2O_5/TiO_2$ heterojunction for photocatalytic $CO_2$ reduction; wherein the composite is either supported or unsupported. In some embodiments, the present disclosure provides for the use of a composite photocatalyst comprising $V_2AlC@V_2O_5/TiO_2$ heterojunction. This leverages the synergistic effect of $V_2AlC@V_2O_5$, utilizing water and methanol as sacrificial compounds for both photocatalytic $CO_2$ reduction and photocatalytic dry reforming of methanol (DRM). In certain embodiments. these processes are executed employing a fixed-bed and a honeycomb-structured monolith photoreactor. In certain embodiments, significant production of CO is observed during $CO_2$ reduction with water, while the introduction of methanol through DRM leads to a significant increase in methane and hydrogen production. Similarly, compared to the fixed bed, the activity, selectivity, and photostability of the $V_2AlC@V_2O_5/TiO_2$ composite are markedly higher when employing monolith photoreactor for methane formation.

In certain embodiments, the utilization of $V_2AlC@V_2O_5/TiO_2$ immobilized over a monolithic nanotexture presents a promising system for the stable and continuous production of valuable chemicals and fuels. For instance, it exhibits resistance to deactivation, even after undergoing five consecutive cycles.

The present disclosure also provides a process for preparing a composite comprising $V_2AlC@V_2O_5/TiO_2$. In certain embodiments, the process comprises: in-situ growing of $V_2O_5$ on $V_2AlC$; and coupling $V_2AlC@V_2O_5$ with $TiO_2$ to form a heterojunction. In certain the composite is prepared using a single-step sol-gel process.

Thus, in certain embodiments, the present disclosure provides a process for preparing a composite comprising $V_2AlC@V_2O_5/TiO_2$; wherein the process comprises the steps of:

a) mixing a titanium precursor and an alcohol solvent, and stirring to obtain a first solution;

b) mixing an acid with an alcohol solvent, and stirring to form a second solution;

c) mixing the second solution and the first solution, and stirring to obtain a third solution (titanium solution);

d) dispersing $V_2AlC$ in the alcohol solvent;

e) adding the dispersed $V_2AlC$ to the third solution to get a suspension, and stirring the suspension for a predetermined period;

f) drying the suspension to obtain a dried product;

g) grinding the dried product into fine powder; and h) calcining the ground product at about 450-550° C. for about 2-4 h to obtain the composite comprising $V_2AlC@V_2O_5/TiO_2$.

Step a):

In certain embodiments of the process, in step a), the titanium precursor comprises a titanium alkoxide, a titanium oxide, a titanium halide (such as titanium chloride and the like), or mixture thereof. In some embodiments, the titanium precursor comprises a titanium alkoxide. Examples of titanium alkoxide include, but are not limited to, titanium (IV) isopropoxide, titanium n-butoxide and titanium ethoxide, or a mixture thereof. In some embodiments, the titanium precursor comprises titanium (IV) isopropoxide.

In certain embodiments, the alcohol solvent comprises methanol, ethanol, or 2-propanol or a mixture thereof. In some embodiments, the alcohol solvent comprises 2-propanol.

In certain embodiments, the ratio of the titanium source to the alcohol solvent is from about 1:1 to about 1:3. In some embodiments, the ratio of the titanium source to the alcohol solvent is about 1:1, about 1:1.5, about 1:2, about 1:2.5, or about 1:3.

In certain embodiments, the stirring is done at a temperature of about 10° C. to about 50° C. for about 15 min to about 60 min. In some embodiments, the stirring is done at room temperature for about 15 min to about 45 min, about 20 min to about 45 min, or about 25 min to about 45 min. In some embodiments, the stirring is done at room temperature for about 15 min, about 20 min, about 25 min, about 30 min, about 35 min, about 40 min, or about 45 min. In some instances, the stirring is done at room temperature for about 30 min.

Step b):

As described above, step b) comprises mixing an acid with an alcohol solvent, and stirring to form a second solution. In certain embodiments, in step b), the acid is an organic acid or an inorganic acid. The acid comprises acetic acid, HCl, or a mixture thereof. In certain embodiments, the acid comprises acetic acid.

In certain embodiments, in step b), the alcohol solvent is same as described above in step a). The ratio of the acid to the alcohol solvent is from about 0.5:1 to about 1:1. In some embodiments, the ratio of the acid to the alcohol solvent is about 0.5:1, about 0.6:1, about 0.7:1, about 0.8:1, or about 0.9:1, or about 1:1.

In certain embodiments, the stirring is done at a temperature of about 10° C. to about 50° C. for about 5 min to about 45 min. In some embodiments, the stirring is done at room temperature for about 5 min to about 40 min, about 5 min to about 35 min, about 5 min to about 30 min, for about 5 min, about 10 min, about 15 min, about 20 min, about 25 min, about 30 min, about 35 min, about 40 min, or about 45 min.

Step c):

Step c) comprises the mixing the second solution and the first solution, and stirring to obtain a third solution (titanium solution). In certain embodiments, the ratio of the first solution to the second solution is from about 1:1 to about 1:2. In some embodiments, the ratio of the first solution to the second solution is about 1:1, about 1:1.1, about 1:1.2, about 1:1.3, about 1:1.4, about 1:1.5, about 1:1.6, about 1:1.7, about 1:1.8, about 1:1.9, or about 1:2.

In certain embodiments, the stirring is done at a temperature of about 10° C. to about 50° C. for about 15 min to about 60 min. In some embodiments, the stirring is done at room temperature for about 15 min to about 45 min, about 20 min to about 45 min, or about 25 min to about 45 min. In some embodiments, the stirring is done at room temperature for about 15 min, about 20 min, about 25 min, about 30 min, about 35 min, about 40 min, or about 45 min. In some instances, the stirring is done at room temperature for about 30 min.

In some embodiments, the third solution (titanium sol) is obtained by hydrolyzing TTIP (Titanium (IV) isopropoxide in acetic acid (1 M) using 10 mL of TTIP dissolved in 2-propanol, in accordance with a previously reported procedure [17].

Step d):

Step d) comprises dispersing $V_2AlC$ in the alcohol solvent. In certain embodiments, the dispersing is done at a temperature of about 10° C. to about 50° C. for about 15 min to about 60 min. In some embodiments, the dispersing is done at room temperature for about 15 min to about 60 min, about 15 min to about 45 min, about 20 min to about 45 min, or about 25 min to about 45 min. In some embodiments, the stirring is done at room temperature for about 10 min, about 15 min, about 20 min, about 25 min, about 30 min, about 35 min, about 40 min, or about 45 min. In some instances, the stirring is done at room temperature for about 10 min to about 30 min.

Step e)

Step e) comprises adding the dispersed $V_2AlC$ to the third solution to get a suspension, and stirring the suspension for a predetermined period. In certain embodiments, the ratio of $V_2AlC$ dispersed in the alcohol solvent to the third solution is from about 1:1 to about 1:2. In some embodiments, the ratio of $V_2AlC$ dispersed in the alcohol solvent to the third solution is about 1:1, about 1:1.1, about 1:1.2, about 1:1.3, about 1:1.4, about 1:1.5, about 1:1.6, about 1:1.7, about 1:1.8, about 1:1.9, or about 1:2.

In certain embodiments, the alcohol solvent is same as described above in step a). In some embodiments, about 5 to about 25 wt. % of $V_2AlC$ is dispersed in the alcohol solvent (e.g., 2-propanol). In some instances, about 5 to about 20 wt. %, or about 5 to about 15 wt. % of $V_2AlC$ is dispersed in the alcohol solvent. In further instances, about 5 wt. %, about 10 wt. %, or about 15 wt. % of $V_2AlC$ is dispersed in the alcohol solvent.

In certain embodiments, after adding the dispersed $V_2AlC$ to the third solution results in a suspension. Then the suspension is stirred for a predetermined period. In certain embodiments, the suspension is stirred at a temperature of about 10° C. to about 50° C. for about 12 h to about 36 h. In some embodiments, the suspension is stirred at room temperature for about 20 h to 28 h. In some instances, the suspension is stirred at room temperature for about 24 h.

Step f):

Step f) comprises drying the suspension obtained in step e) to obtain a dried product. In certain embodiments, the drying is done at a temperature of about 80° C. to about 120° C. for about 4 h to about 32 h. Any drying technique, such as normal over drying, micro-oven drying, and the like, may be employed. In some embodiments, the suspension is oven-dried at about 80-120° C. overnight. In some instances, the suspension is oven-dried at about 100° C. for overnight.

Step h):

Step h) comprises the step of calcining the ground product at about 450-550° C. for about 2-4 h to obtain the composite comprising $V_2AlC@V_2O_5/TiO_2$. In certain embodiments, the ground product is calcined at about 500° C. for about 2 h.

In certain embodiment of the process, the composite referred to in the preceding embodiments can be a supported composite, or an unsupported composite. In some embodiments, the composite is a supported composite. In certain embodiments, the supported composite is prepared by coating a support with the suspension obtained in step e) above. In some embodiments, the coating is done by dip coating. The support is same as defined in the preceding embodiments. In certain embodiments, the support is a honeycomb support.

Accordingly, in some embodiments, the present disclosure provides a process for preparing a supported composite photocatalyst comprising $V_2AlC@V_2O_5/TiO_2$ heterojunction by sol-gel dip coating method.

In certain embodiments of the process, $TiO_2$ is distributed over the whole surface of $V_2AlC$. In certain embodiments, all the elements of the composite (V, Al, C, Ti and O) are evenly and/or uniformly distributed within the composite. In some embodiments, all the elements of the composite (V, Al, C, Ti and O) are evenly and uniformly distributed within the composite.

In certain embodiments, the present disclosure provides a composite photocatalyst comprising $V_2AlC@V_2O_5/TiO_2$ heterojunction prepared by the process of any of the preceding embodiments.

In certain embodiments, the composite photocatalyst comprising $V_2AlC@V_2O_5/TiO_2$ heterojunction provided above or the composite photocatalyst prepared by the process of the present disclosure is useful for photocatalytic $CO_2$ reduction. Therefore, the present disclosure further provides a process for $CO_2$ reduction.

In certain embodiments, the present disclosure provides a process for $CO_2$ reduction, comprising:

contacting a feed comprising $CO_2$ and at least one sacrificial compound with a composite photocatalyst comprising $V_2AlC@V_2O_5/TiO_2$ heterojunction in a photoreactor system; and irradiating the photocatalyst with at least one irradiation source;

wherein the composite is a supported composite or an unsupported composite, as described above.

In certain embodiments the process for $CO_2$ reduction is carried at a temperature of about 25 to about 80° C. and a pressure of about 1 to 1.5 atm. In some embodiments, the process is carried out at room temperature and atmospheric pressure. In some embodiments the process for $CO_2$ reduction is carried for a time period of about 1-4 h.

In certain embodiments, the sacrificial compound comprises water, methanol, or a mixture thereof. In some embodiments, the sacrificial compound comprises water. In some instances, the sacrificial compound comprises methanol-water mixture. In certain embodiments, the process selectively or majorly produces CO when $CO_2$ reduction is carried out with water, and the process increases methane and hydrogen production by introducing methanol through dry reforming.

In certain embodiments, the photoreactor system comprises a main reactor chamber, one or more cooling fans integrated with an irradiation light source, one or more mass flow controllers (MFC), and an online products analysis system.

According to the present disclosure, any light or irradiation source emitting wavelengths absorbable by the photocatalyst can be utilized for activation. These sources may include natural sources like sunlight or artificial sources such as lasers, Hg lamps, incandescent lamps, fluorescent tubes, plasma, or Light-Emitting Diodes (LEDs). In some embodiments, the source of light is a Hg lamp.

In certain embodiments, the irradiation source is positioned external to the reactor, and their interaction occurs through an optical interface. This interface, which facilitates the diffusion of photons absorbable by the photocatalyst into the reactor, can be constructed from materials such as quartz, glass, or any other suitable material. In certain embodiments, the optical interface is a quartz glass window.

In some embodiments, the source of light is a Hg lamp (e.g., 200 W Hg lamp) located above the quartz glass window.

In certain embodiments, a water saturator is integrated into the reactor system to facilitate the transportation of moisture or a methanol-water mixture along with $CO_2$. This integration ensures a controlled and efficient delivery of these compounds into the reactor environment. The water saturator operates by saturating the carrier gas, typically $CO_2$, with water vapor. By passing the $CO_2$ through the water saturator, moisture or the methanol-water mixture becomes effectively carried along with the $CO_2$ stream into the reactor. This ensures a consistent and controlled supply of the desired compounds, essential for the successful execution of various photocatalytic processes within the reactor system.

In certain embodiments, the feed enters the reactor at the top and flows over the catalyst surface before exiting at the bottom. The bottom surface of the reactor chamber, where a uniformly distributed powder photocatalyst is present, serves as the primary area for interaction among the catalyst, reactants, and light source. Before commencing the experiments, a feed mixture (e.g., $CO_2$ and $H_2O$) is continuously passed through the reactor for a predetermined time to saturate the catalyst surface.

Accordingly, in certain embodiments, the process for $CO_2$ reduction comprises:

a) providing a photoreactor system comprising a main reactor chamber, cooling fans integrated with an irradiation light source, mass flow controllers (MFC), and an online products analysis system;

b) utilizing an irradiation source positioned above a quartz glass window which allows light/irradiation passage through the reactor system;

c) integrating a water saturator with the reactor system for carrying the at least one sacrificial compound with $CO_2$;

d) introducing the feed at the top of the reactor and allowing it to flow over the composite photocatalyst surface before exiting at the bottom surface; wherein the composite photocatalyst comprises $V_2AlC@V_2O_5/TiO_2$ heterojunction; and e) passing the feed through the reactor for about 5 minutes to about 45 minutes before starting the experiments to saturate the catalyst surface;

In certain embodiments, the photoreactor is a monolith photoreactor or a fixed-bed photoreactor. These two configurations offer distinct advantages and are selected based on specific experimental requirements and desired outcomes.

The monolith photoreactor features a specially engineered monolithic structure or support inserted within the reactor chamber. This design facilitates efficient distribution of light and flowing of reactant gases, thereby enhancing the photocatalytic efficiency of the system. Conversely, the fixed-bed photoreactor involves the distribution of catalyst material within the reactor chamber, typically in a powdered form uniformly spread across the reactor's bottom surface. This configuration provides a well-defined surface area for catalytic interactions, enabling precise control over reaction parameters.

An illustrative and typical schematic representation of both fixed-bed and monolith photoreactors for photocatalytic $CO_2$ reduction can be found in the work of Muhammad Tahir et al. [16]. This schematic offers valuable insights into the design and operation of these photoreactor configurations, serving as a reference for implementing similar setups in experimental studies.

Thus, in certain embodiments, when the photoreactor is a fixed-bed photoreactor, the process comprises: uniformly distributing powdered composite photocatalyst inside the reactor bottom surface; and utilizing a reactor chamber bottom surface with uniformly distributed powdered photocatalyst as the only exposed surface area where the catalyst, reactants, and light source interact; and when the photoreactor is a monolith photoreactor, the process comprises inserting a monolith inside the reactor chamber with support fixed at the middle of the reactor for efficient distribution of light and flowing of reactant gases; and immobilizing the composite photocatalyst over the monolithic channels prior to loading into the reactor.

In certain embodiments, when the process uses $V_2AlC@V_2O_5/TiO_2$ composite, the main products obtained are CO and $CH_4$ during photocatalytic $CO_2$ reduction with $H_2O$ as the reducing agent (sacrificial compound) in a fixed bed reactor. In some embodiments, when methanol is used as the reducing agent with $V_2AlC@V_2O_5/TiO_2$ composites, the $CO_2$ is efficiently converted to CO, $CH_4$ and $H_2$ as the main products.

In certain embodiments, when $V_2AlC@V_2O_5/TiO_2$ composite is loaded over a monolithic support and tested for photocatalytic $CO_2$ reduction through bi-reforming of methanol, a significant amount of $CH_4$ and $H_2$ are produced compared to fixed bed reactor.

In certain embodiments, the process of $CO_2$ reduction with $V_2AlC@V_2O_5/TiO_2$ composite using water and bi-reforming of methanol is evaluated in both a fixed bed and a monolith photoreactor. In certain embodiments, about 5 to about 25 wt. % $V_2AlC@V_2O_5/TiO_2$ composite is used in the process. In some embodiments, about 5 to about 20 wt. %, about 5 to about 15 wt. %, about 5 wt. %, about 10 wt. %, or about 15 wt. % $V_2AlC@V_2O_5/TiO_2$ composite is used in the process.

In the fixed bed reactor, employing $V_2AlC@V_2O_5/TiO_2$ with a methanol-water mixture yielded a CO yield of 13.75 mmol $g^{-1}$ $h^{-1}$, surpassing water and pristine C by 26.39 and 38.19-fold, respectively. Similarly, $CH_4$ production is enhanced by 1.97 and 12.33-fold compared to water and $TiO_2$ alone, while $H_2$ production is undetectable when using water alone. The heightened photoactivity with methanol is attributed to efficient photoinduced carrier separation facilitated by the synergistic effect of $V_2AlC/V_2O_5$ and increased proton production.

In the monolith photoreactor, $CH_4$, CO, and $H_2$ production rates reached 55.44, 35.51, and 1.638 mmol $g^{-1}$ $h^{-1}$, respectively, exceeding those achieved with the fixed bed reactor by 166.50, 2.58, and 3.05 times. This superior photoactivity is attributed to improved photon flux utilization through surface reactions, resulting in increased production and utilization of photoinduced charge carriers.

After five consecutive cycles, the highest quantum yields (QY) for $CH_4$, CO, and $H_2$ are 48.374%, 25.358%, and 1.51%, respectively, representing increases of 200.5, 2.54, and 3.87-fold compared to the fixed bed.

The present disclosure is further described with reference to the following examples, which are only illustrative in nature and should not be construed to limit the scope of the present disclosure in any manner.

The chemicals used for the preparations of catalysts were Titanium (IV) isopropoxide (Sigma Aldrich), Acetic acid (Merck), 2-propanol (Merck). Also, monoliths used were with 200 channels per square inch (CPSI 200) and vanadium aluminum carbide (V2AlC) from Changsha Easchem Co. Limited, China.

EXAMPLES

Experimental Details

Example 1: Synthesis of $V_2AlC@V_2O_5/TiO_2$ Composite

The sol-gel process was used to synthesize $V_2AlC@V_2O_5/TiO_2$ composite, while TTIP served as the precursor. According to a specific process, titanium sol was produced by hydrolyzing TTIP in acetic acid (1M) using 10 mL of TTIP that was dissolved in 2-propanol [31]. After stirring for 4 hours, specific quantity of $V_2AlC$ (10 wt. %) dispersed in 2-propanol was added to titanium solution and the suspension was being stirred for 24 hours before being oven dried at 100° C. overnight. The product obtained was grinded into fine powder before being calcined for 2 hours at 500° C. The product obtained was given named as $V_2AlC@V_2O_5/TiO_2$ composite. The same procedure was used to synthesize pure $TiO_2$ NPs, but without the addition of $V_2AlC$. For the comparative analysis, $V_2AlC/TiO_2$ composite was also synthesized using physical mixing method. In this case, $V_2AlC$ and $TiO_2$ were dispersed in a methanol and was stirred for 4 hours before being dried overnight at 100° C.

Figure 1:
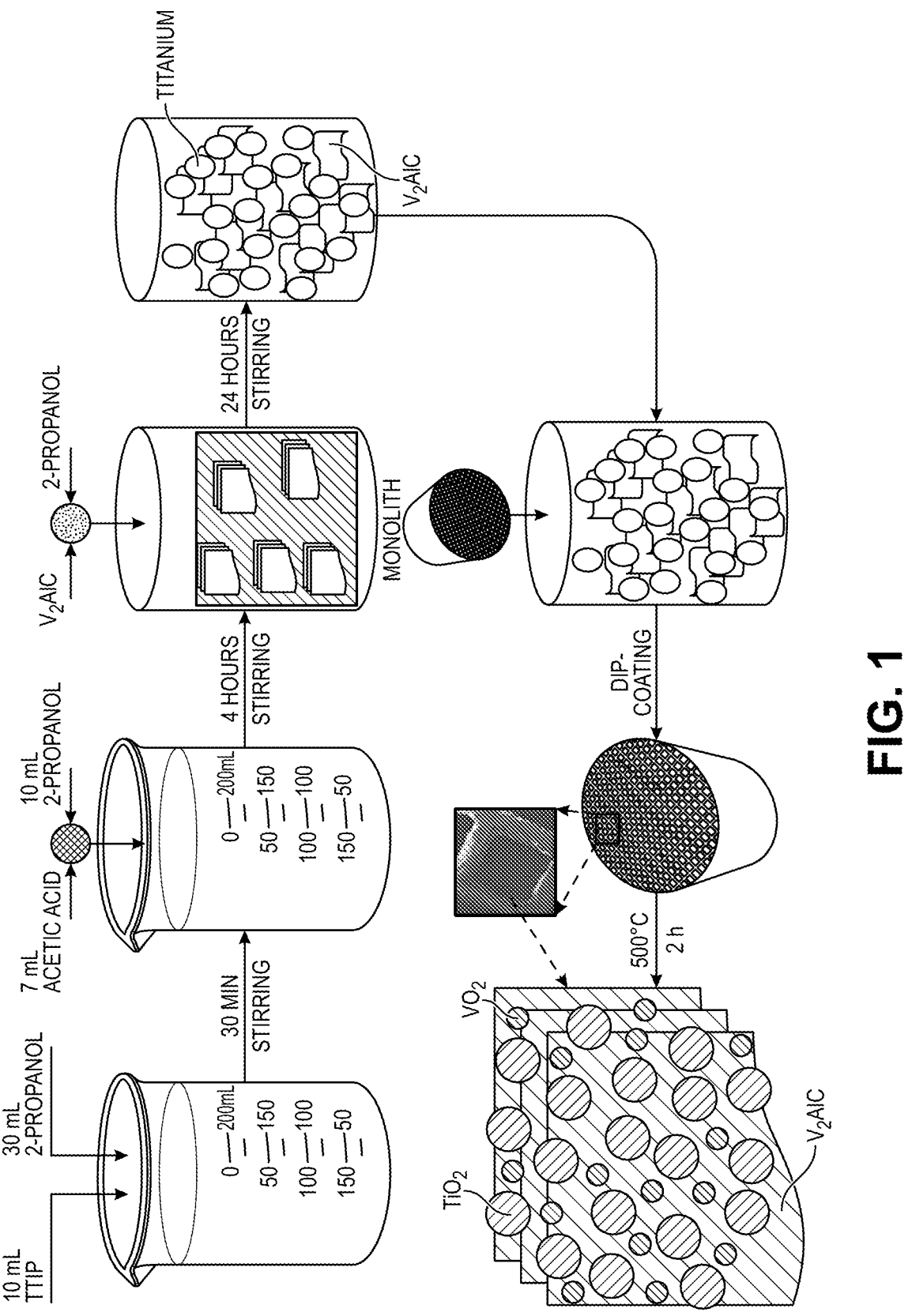
FIG. 1 shows a schematic illustration of the synthesis of a $V_2AlC@V_2O_5/TiO_2$ composite loaded over a monolithic microchannels using sol-gel dip coating method.

Example 2: Synthesis of $V_2AlC@V_2O_5/TiO_2$ Composite Loaded Over Honeycomb Support The $V_2AlC@V_2O_5/TiO_2$ composite was loaded over the monolithic support using the modified sol-gel dip coating method. First, monoliths were prepared before the catalysts were loaded onto their surface. The specific size monolith (with a thickness of 2 cm and a radius of 6 cm) were washed with acetone and methanol to remove any impurities. After drying and cooling, the initial weight of the monolith was calculated. The $V_2AlC@V_2O_5/TiO_2$ sol obtained in the previous section, before drying, was placed in a large size beaker to fully insert monoliths inside for dip coating. The monoliths were submerged into the above solution for a short time before being removed, and extra sol from the monolith channels was removed out using compressed air. To get the desired amount of film thickness and catalyst loading over the monolithic surface, it was dipped more than one time by repeating the same procedure. In the next step, monoliths loaded with catalysts were dried in oven at 100° C. for 24 hours and finally heated at 500° C. for 2 hours to get $V_2AlC@V_2O_5/TiO_2$ loaded over monolithic support. The amount of catalyst loaded over the monolithic channels was calculated by subtracting the final weight of the catalyst-loaded over the monolith from the bare ones. Around 150 milligrams of catalyst were loaded over the channels which was closer to what was used as a powder in a fixed bed reactor. FIG. 1 shows a schematic illustration of the synthesis of a $V_2AlC@V_2O_5/TiO_2$ composite loaded over a monolithic support.

Characterization

Several analytical techniques were used to characterize each catalyst sample. XRD (X-ray powder diffraction) with the aid of a Bruker Advance D8 diffractometer (Rigaku Smart Lab-Cu—K, =0.154178 nm), the purity and crystal phases structures were examined. Scanning Electron Microscopy (SEM, JEOL 6010 PLUS/LA), the structure and morphology of the pure and the composite materials were obtained. X-ray photoelectron spectroscopy (XPS) was used to determine elemental states (Axis ultra-DLD Shimadzu). The binding energy of C is at 284.60 eV was sued a as a reference to calibrate all the elements high resolution peaks. Photoluminescence (PL) spectroscopy was conducted with a 325 nm-wavelength laser (HORIBA Scientific). To establish the interaction between the composite materials, a Raman examination was carried out using a HORIBA Scientific Spectrophotometer (laser at 532 nm). The UV-visible diffuse reflectance absorbance spectra were obtained using Carry 100 Agilent UV-vis spectrophotometer (model #G9821A). the powder samples were loaded with sample holder before analysis.

Electrochemical impedance spectroscopy (EIS) was performed using a traditional three-electrode cell and a CS350 electrochemical workstation from Wuhan Corrtest Instruments Corp., Ltd. (Wuhan, China). The electrolyte used was a 0.2 M $Na_2SO_4$ solution, the reference electrode was an Ag/AgCl electrode, and the counter electrode was a Pt mesh (CE). A precise amount of catalyst was dissolved in methanol to create a uniform thick slurry, which was then placed evenly over the FTO glass which was used as the working electrode. The coated FTO glass was allowed to dry at 80° C. before being used as the electrode.

Example 3: Photoactivity Test/Photocatalytic CO₂ Reduction

The process of $CO_2$ reduction with $V_2AlC@V_2O_5/TiO_2$ composite was evaluated in both a fixed bed and a monolith photoreactor. The schematic representation of a fixed bed and monolith reactor for photocatalytic $CO_2$ reduction is reported earlier [16]. The photocatalytic system includes main reactor chamber, cooling fans integrated with a lamp, mass flow controllers (MFC) and online products analysis system. The source of light was a 200 W Hg lamp located above the quartz glass window which allows to pass light through the monolith channels. The intensity of the light can be varied from 50 mW/cm² to about 150 mW/cm². For the visible light experiments, the solar simulator of lamp power 300 W and light intensity 100 mW/cm² can be used. For low-intensity visible light experiments, a 35 W lamp of intensity 20 mW/cm² can be used. To carry either moisture or methanol-water mixture with $CO_2$, a water saturator was integrated with the reactor system. The experiments were conducted using powder catalysts and also loaded over the monolithic support. For the fixed bed type photoreactor system, 150 mg of powder catalyst was uniformly distributed inside the reactor bottom surface. The catalyst loading amount can be varied from 25 mg to 250 mg. The feed mixture entered at the top of the reactor and was flowing at a rate of 20 mL/min over the catalyst surface before leaving the reactor at the bottom surface. The flow rate of the gas mixture can be varied from (10 mL/min to 100 mL/min). The reactor chamber bottom surface had a uniformly distributed powder photocatalyst is the only exposed surface area where the catalyst, reactants, and light source interacted. Before starting the experiments, a feed mixture ($CO_2$ and $H_2O$) was continuously passed through the reactor for 30 minutes to saturate the catalyst surface. For photocatalytic $CO_2$ reforming of methanol (PCRM), 10% methanol-water solution was prepared, and $CO_2$ was passed through the methanol solution to carry vapours of methanol-water before entering the reactor. The methanol concentration can be varied from 1 to 30 vol. %. The temperature inside the reactor can be varied from 25° C. to 120° C. using external heating and cooling systems. The pressure inside the reactor was kept 1 atm and it can be varied from 1 to 5 atm.

In the case of the monolith photoreactor system, the monolith was inserted inside the reactor chamber with a support to fixed at the middle of the reactor for efficient distribution of light and flow of reactant gases. The reactor chamber in this instance was the same as that of the fixed bed reactor, but the catalyst was immobilized over the monolithic channels before being loaded into the reactor. The monolith thickness can be varied from 0.2 cm to 6 cm at a fixed diameter of 6 cm. The monolith sizes can be varied from 100 to 400 channels per square inch (CPSI). The operating process and all experimental settings were the same as those for the fixed bed reactor previously mentioned. Gas chromatography using TCD and FID detectors was used to examine the products. Both the TCD and FID detectors were connected with Carboxen-1010 PLOT capillary columns for the identification of CO, $CO_2$, $CH_4$, and $H_2$ compounds.

Quantum Yield and Selectivity Calculations

The performance of catalysts can be significantly changed in photocatalytic $CO_2$ reduction applications by varying the light intensity, wavelength, and illuminated surface area. Different products require different amounts of electrons to make them, depending on the type of product. For example, one mole of CO, $H_2$, and $CH_4$ requires 2, 2, and 8 electrons, respectively. Quantum efficiency study is essential for assessing photocatalytic $CO_2$ reduction systems under varied operating situations. Quantum yield (QY) is a term used to describe the ratio of a product production rate in units of time to the quantity of photon flux that is consumed in a unit of time to produce the same product. Equations (1)-(3) were used to calculate the QY for CO, $H_2$ and $CH_4$ production. The photon flow was computed using Eq. (4), which considers light intensity and wavelength of light irradiation.

$$QY \text{ of } CO = \frac{2 \times \text{number of moles of CO } (\mu mol \ h^{-1})}{\text{Photon flux} \times \text{incident area } (m^2)} \quad (1)$$

$$QY \text{ of } H_2 = \frac{2 \times \text{number of moles of } H_2 \ (\mu mol \ h^{-1})}{\text{Photon flux} \times \text{incident area } (m^2)} \quad (2)$$

$$QY \text{ of } CH_4 = \frac{8 \times \text{number of moles of } CH_4 \ (\mu mol \ h^{-1})}{\text{Photon flux} \times \text{incident area } (m^2)} \quad (3)$$

$$\text{Photon flux} = \frac{\lambda(m)}{h \times v} \times \text{light intensity } (w \ m^{-2}) \quad (4)$$

where $\lambda$ is the light wavelength, h is the planks constant ($6.626 \times 10^{-34}$ J s), and v is the photon density ($3.0 \times 10^{-8}$). As shown in Equations (5) and (6), the amount of a given product obtained and the number of electrons consumed were used to calculate the selectivity of CO, $H_2$ and $CH_4$.

$$CO \text{ selectivity } (\%) = \frac{2 \times RCO(\mu mol \ g^{-1}h^{-1})}{2 \times RH_2(\mu mol \ g^{-1}h^{-1}) + 8 \times RCH_4(\mu mol \ g^{-1}h^{-1}) + 2 \times RCO(\mu mol \ g^{-1}h^{-1})} \quad (5)$$

$$H_2 \text{ selectivity } (\%) = \frac{2 \times RH(\mu mol \ g^{-1}h^{-1})}{2 \times RH_2(\mu mol \ g^{-1}h^{-1}) + 8 \times RCH_4(\mu mol \ g^{-1}h^{-1}) + 2 \times RCO(\mu mol \ g^{-1}h^{-1})} \quad (6)$$

$$CH_4 \text{ selectivity } (\%) = \frac{8 \times RCH_4(\mu mol \ g^{-1}h^{-1})}{2 \times RH_2(\mu mol \ g^{-1}h^{-1}) + 8 \times RCH_4(\mu mol \ g^{-1}h^{-1}) + 2 \times RCO(\mu mol \ g^{-1}h^{-1})} \quad (7)$$

Where RCO, $RH_2$ and $RCH_4$ represents CO, $H_2$ and $CH_4$ production rates during photocatalytic $CO_2$ reduction and 2, 2 and 8 are the electrons that would be spent for producing CO, $H_2$ and $CH_4$ correspondingly.

Results:

Characterization

FIG. 1 (a) shows crystal structures of $V_2AlC$ and $V_2AlC@V_2O_5$ samples. The XRD patterns for $V_2AlC$ appeared at 2θ of 13.46°, 27.11°, 35.56°, 41.16°, 45.32°, 55.52°, 63.81°, 75.12°, associated with typical planes of (002), (004), (100), (103), (104), (106), (110) and (109), respectively, associated to $V_2AlC$ MAX. This confirms high purity MAX which correspond to the standard data of hexagonal $V_2AlC$ MAX structure (JCPDS Card No. 29-0101 [35, 36]. 2θ peaks for $V_2O_5$ were appeared at 15.5°, 20.3°, 26.0°, 31.10 and 34.4°, matching with typical planes of (200), (010), (101), (310) and (301), associated to $V_2O_5$ (JCPDS Card No. 00-041-1426). This shows that when $V_2AlC$ MAX was heated at 500° C. for 2 hours, it was partially converted to vanadium oxide, thus producing $V_2AlC@V_2O_5$ mixture. In a recent work, oxidation behaviors of $V_2AlC$ MAX were conducted at different temperatures for a duration of 5 to 30 minutes. It was observed that using lower temperature less than 500° C., the traces amount of $V_2O_5$ was produced. When temperature was increased to 700° C., after 5 minutes, $V_2AlC$ MAX was partially converted to $VO_2$ and $V_2O_5$, however, when the time was increased to 30 minutes, $V_2AlC$ was completely oxidized [26].

XRD patterns of $TiO_2$ and $V_2AlC@V_2O_5/TiO_2$ composites are demonstrated in FIG. 2 (*b*). The main differential peaks for $V_2AlC$ were appeared at 2-theta of 13.46° and 41.16°, matching the typical (0 0 2) and (1 0 3) facets of $V_2AlC$ MAX. The XRD patterns of $TiO_2$ appeared at 2θ of 25.50°, 38.0°, 48.32°, 54.1°, 55.24°, 62.92°, 69.25°, and 70.51°, attributed to (1 0 1), (0 0 4), (1 0 5), (2 1 1), (0 0 2), (2 0 4), (1 1 6), and (2 2 0) planes, respectively. This confirms the existence of $TiO_2$ in anatase phase, synthesized using sol-gel method (JCPDS Card No. 01-084-1285). Furthermore, constructing $V_2AlC@V_2O_5/TiO_2$ composite, crystalline structure was unaffected while using the sol-gel process. During heating $V_2AlC$ with $TiO_2$ at 500° C. for 2 hours, some of $V_2AlC$ was converted to $V_2O_5$ to produce $V_2AlC@V_2O_5/TiO_2$ composite. XRD peaks related to $V_2O_5$ were overlapped with $TiO_2$, thus identification of $V_2O_5$ grown over $V_2AlC$ layered structure coupled with $TiO_2$ was not possible. The other possible reasons could be the small amount of $V_2O_5$ produced during oxidation at lower temperature (500° C.), which was below the detection limit.

FIG. 2 (*c*) shows Raman spectra of $V_2AlC$ with prominent three peaks located at 157.5, 252.6 and 349.6 $cm^{-1}$, ascribed to $\omega_1$, $\omega_3$ and $\omega_4$, respectively. The Raman spectrum at 157.5 and 252.6 $cm^{-1}$ presents the in-plane vibrations of Al and V atoms in the $V_2AlC$ MAX structure. The Raman peak at 349.6 $cm^{-1}$ further presents the characteristic features of pure $V_2AlC$. FIG. 2 (*d*) shows Raman spectra of $V_2AlC@V_2O_5$ mixture, which was produced during the oxidation of $V_2AlC$ MAX at 500° C. for 2 hours. The Raman peaks for $V_2O_5$ were appeared at 144.4, 198.9, 284.6, 303.9, 405.4, 486.5, 529.8, 573.2, 679.3, and 705.1 $cm^{-1}$. The peaks at 144.4 and 198.9 $cm^{-1}$ associated to lattice vibrations and relates to $V_2O_5$ layers motion relative to each other. The peaks at 284.6 and 405.4 $cm^{-1}$ assigned to V=O bending vibration. The peaks at 486.5 and 679.3 $cm^{-1}$ corresponds to bending and stretching vibration of V—O—V, respectively. Similarly, vibrations modes of V—O produce other peaks positioned at 303.9, 529.8 and 705.1 $cm^{-1}$, associated to stretching and bending vibrations.

The Raman spectra for $TiO_2$ and $V_2AlC@V_2O_5/TiO_2$ are demonstrated in FIG. 2 (*c*). Pure $TiO_2$ shows Raman peaks positioned at 142.5, 196.4, 393.3, 512.2 and 635.2 $cm^{-1}$, attributed to $E_{g1}$, $E_{g2}$, $B_{1g}$, $A_{1g}+B_{1g}$, and $A_{g3}$ modes, respectively. In the composite of $V_2AlC/TiO_2$, the bands appeared at 144.2, 197.4, 397.3, 514.4, and 638.1 $cm^{-1}$. It is obvious that all the $TiO_2$ bands were appeared when $V_2AlC$ was added to synthesize $V_2AlC/TiO_2$ composite. However, Raman patterns for $V_2AlC$ were disappeared due to lower peaks intensities and lower quantity of $V_2AlC$ loading to $TiO_2$. Furthermore, due to same band positions like $TiO_2$, the bands of $V_2O_5$ were not identified. More importantly, Raman peaks were shifted to higher number when $V_2AlC$ was added to $TiO_2$, which confirms their good interaction due to using a sol-gel synthesis approach. These findings support the successful synthesis of $V_2AlC@V_2O_5/TiO_2$ composite without changing their phase structure and are in good accord with XRD data.

Figures 3A, 3B, 3C, 3D, 3E, 3F, 3G, 3H:
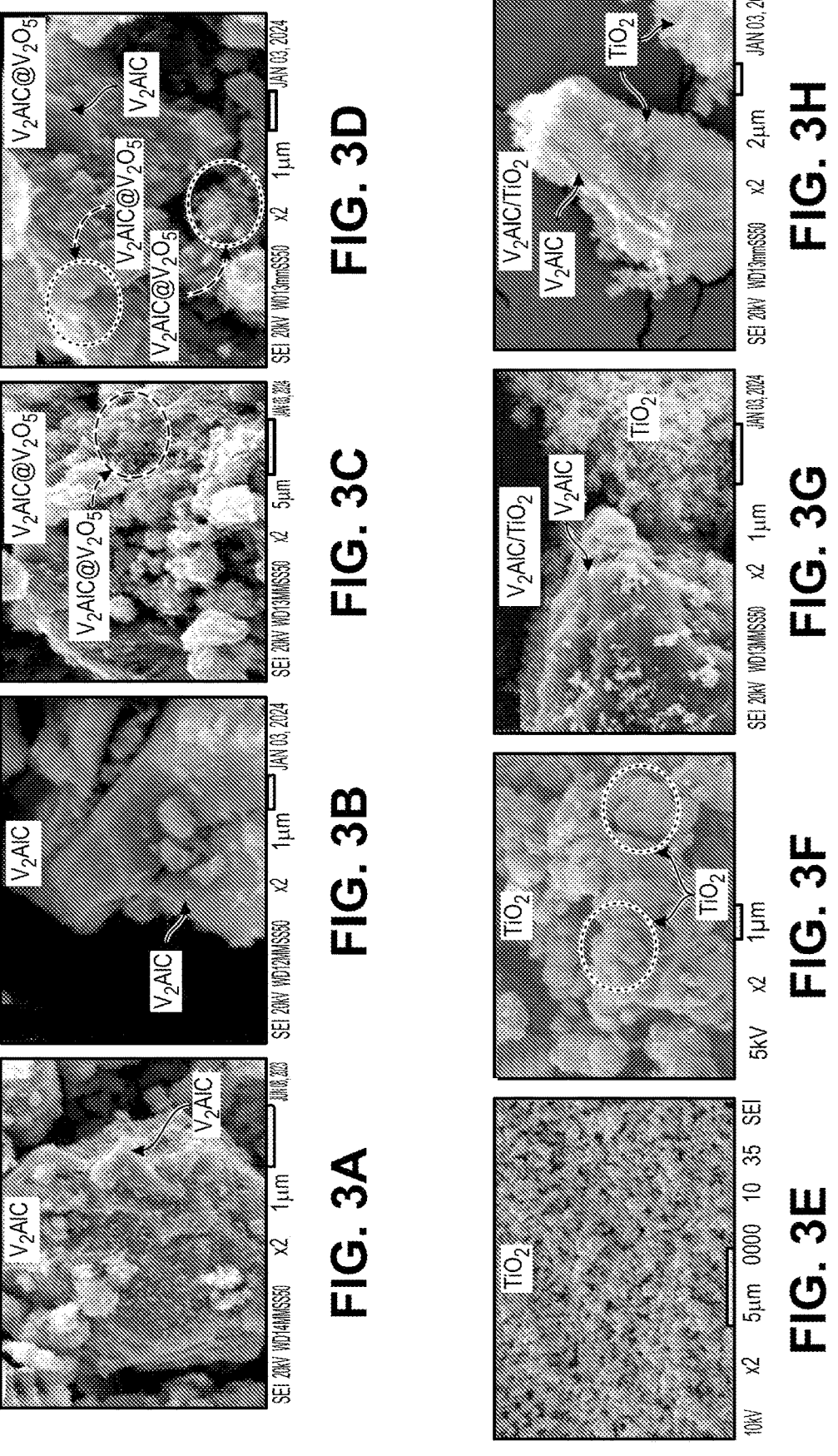
FIGS. 3A-3K illustrate.
Figures 3I, 3J, 3K:
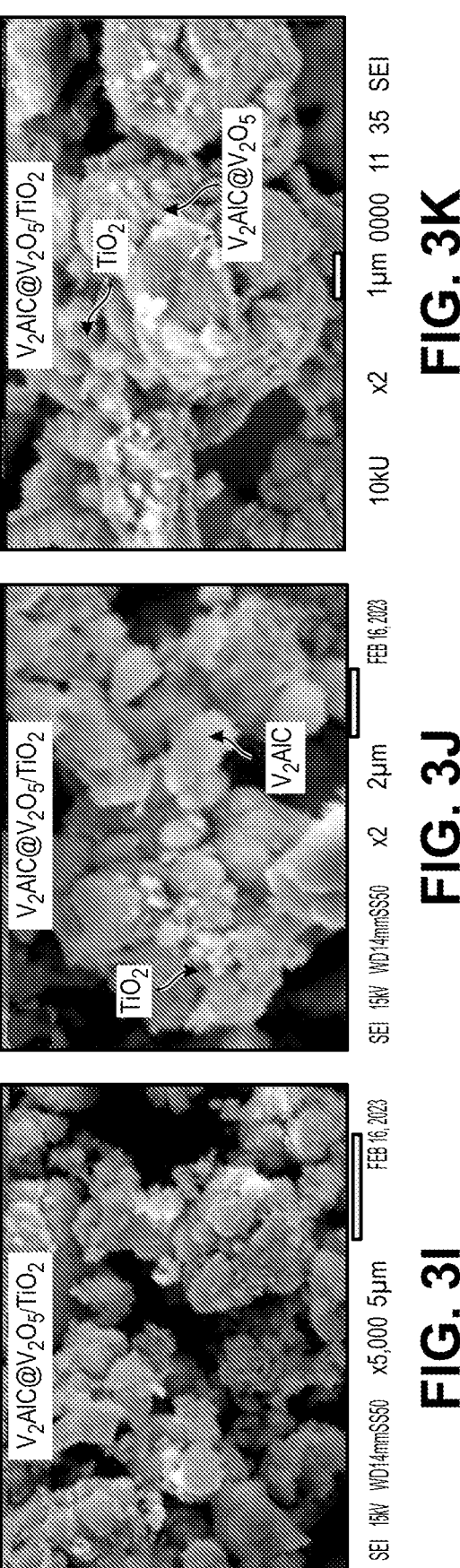

FTIR is a useful technique for determining the composition of pure and composite materials. FIG. 2 (*d*) displays the FTIR spectra of $TiO_2$ and $V_2AlC@V_2O_5/TiO_2$ composite. The vibration mode of the Ti—O was not appeared due to peaks starting from 600 $cm^{-1}$. However, modes appeared at 1635.92 $cm^{-1}$ was due to —OH stretching mode, in the FTIR spectrum of $TiO_2$ nanoparticles. At 3300 to 3800 $cm^{-1}$, the stretching vibrations of the hydroxyl group (—OH) can be seen. Furthermore, for the $V_2AlC@V_2O_5/TiO_2$ composite samples, additional peaks related to C=C and C—H appeared in the stretching vibration modes due to the existence of $V_2AlC$. Using the SEM characterization technique, the morphology of $V_2AlC$, $TiO_2$, and $V_2AlC@V_2O_5/TiO_2$ composite was further examined. FIG. 3 (*a-b*) shows the morphology of $V_2AlC$, in which compact structured sheets can be observed. The $V_2AlC$ MAX is in the form of a block due to a layered structure compacted together. FIG. 3 (*c-d*) showed the morphology of $V_2AlC@V_2O_5$ sample obtained after heating at 500° C. for 2 hours. The $V_2AlC$ MAX showed the similar morphology after heating, however, surface become rough due to heating and partial oxidation takes place at the external surface of the bulk layers. Previously, when $V_2AlC$ was heated to 400° C., its surface become rough, however, morphology was altered after heating above 800° C. This was due to conversion of $V_2AlC$ to $V_2O_5$ with needle like crystals. FIG. 3 (*e*) shows the morphology of anatase phase of $TiO_2$, in which uniform size $TiO_2$ nanoparticles can be observed as spherical shape. FIG. 3 (*f*) shows the morphology of $TiO_2$ produced through sol-gel method. The $TiO_2$ particles are agglomerated together due to their smaller size, produced using the sol-gel method. FIG. 3 (*f-g*) shows the morphology of $TiO_2$ nanoparticles coupled with $V_2AlC$ MAX through physical mixing to produce $V_2AlC/TiO_2$ composite. It can be observed that $TiO_2$ particles are not well dispersed over $V_2AlC$ MAX surface, thus it was unable to provide good interface interaction. The morphology of $V_2AlC@V_2O_5/TiO_2$ was further examined using SEM, and the results are presented in FIG. 3 (*i-k*). $TiO_2$ particles are entirely spread over the $V_2AlC$ structure to provide their good interface interaction. It was further observed that $V_2AlC$ bulk structure was exfoliated due to continuous stirring during the sol-gel process in the presence of alcohols. The presence of $V_2O_5$ particles was not identified because $V_2AlC$ sheets were entirely covered by large $TiO_2$ particles. As a result, the sol-gel method enabled the distribution of $TiO_2$ across the whole surface of the $V_2AlC$ pattern with outstanding dispersion.

Figures 4A, 4B, 4C, 4D, 4F:
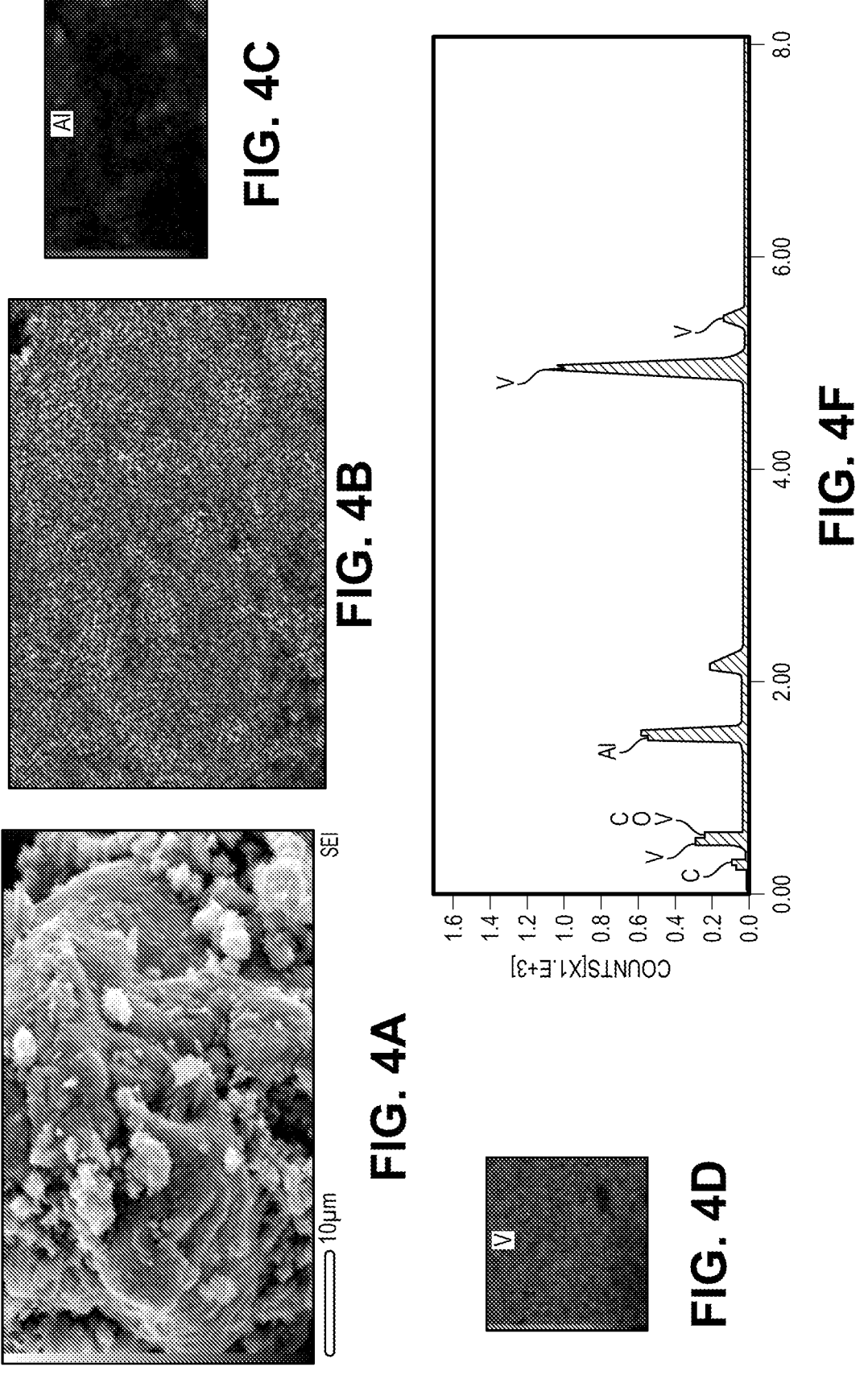

The uniform distribution of elements over $V_2AlC@V_2O_5$ and $V_2AlC@V_2O_5/TiO_2$ composite was further confirmed through EDS mapping analysis, and the results are presented in FIG. 4. FIG. 4 (*a*) shows the morphology of $V_2AlC@V_2O_5$, in which rough surface of $V_2AlC$ MAX structure can be observed. FIG. 4 (*b*) shows the mapping analysis of V, O and Al over the $V_2AlC@V_2O_5$ surface. The surface was entirely covered with Al and V with small amount of oxygen as shown in FIG. 4 (*c-e*). The further existence of C, Al, O, and V elements was observed by EDX spectra as shown in FIG. 4 (*f*). All these finding confirm the partial oxidation of $V_2AlC$ after heating at 500° C. for 2 hours. FIG. 4 (*g*) shows the morphology of $V_2AlC@V_2O_5/TiO_2$ composite, which was used for mapping analysis. It was observed that all the elements of the composite (V, Al, C, Ti and O) were evenly distributed within the composite. This distribution of elements such as C, O, Al, Ti and V can be observed from the color images, as shown in FIG. 4 (*h-l*). FIG. 4 (*m*) shows EDX spectra, in which obvious peaks related to all the elements in the composites could be observed. All these findings confirm the successful synthesis of $V_2AlC@V_2O_5/TiO_2$ composite with uniform distribution of V, Al, C, O and Ti elements.

Figures 5A, 5B, 5C:
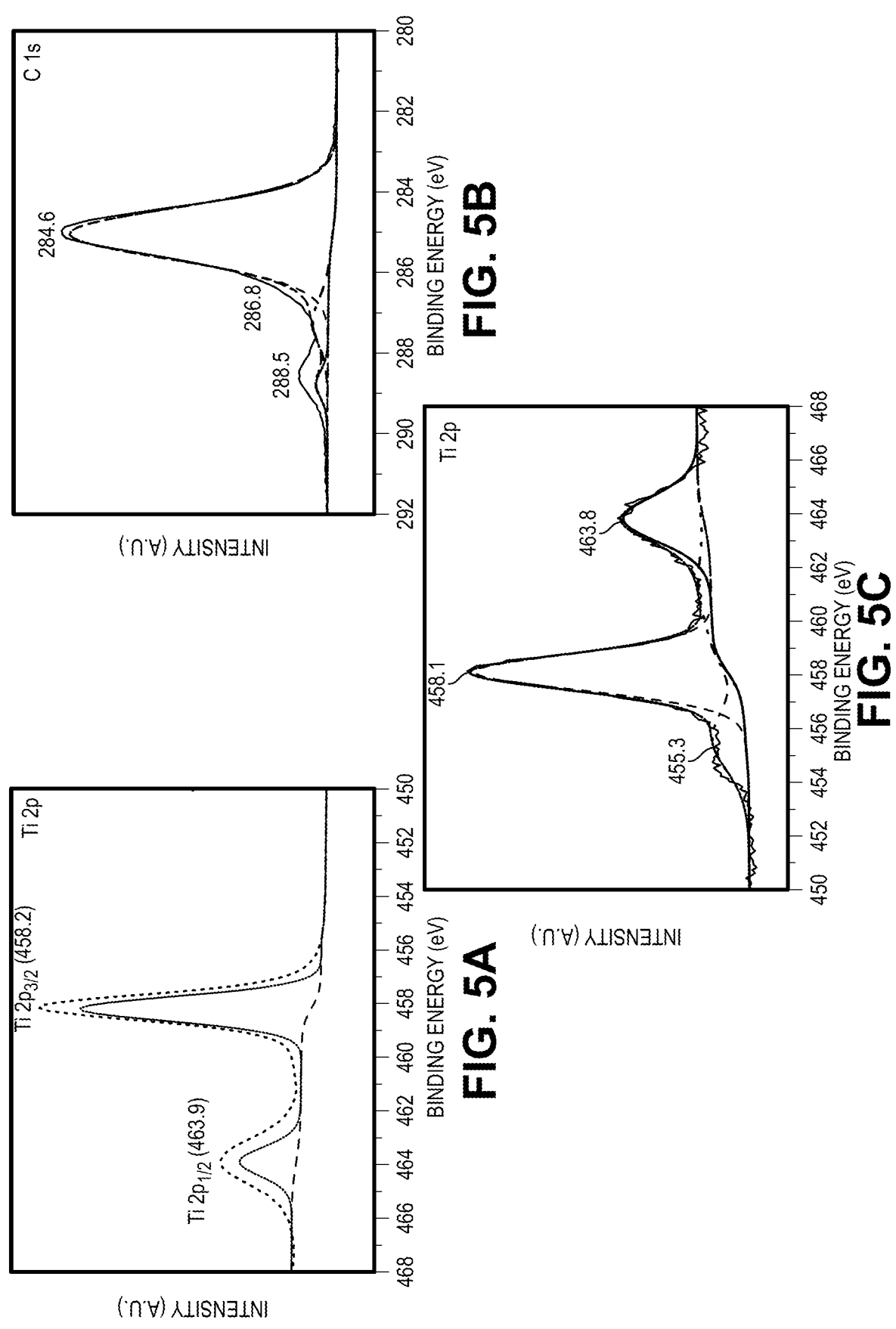
FIGS. 5A-5F illustrate XPS (X-ray photoelectron spectroscopy) spectra of $TiO_2$ and $V_2AlC@V_2O_5/TiO_2$ composite, as follows: XPS analysis of $TiO_2$ for FIG. 5A Ti 2p, FIG. 5B C 1s, XPS analysis of $V_2AlC@V_2O_5/TiO_2$ composite for FIG. 5C Ti 2p, FIG. 5D V 2p, FIG. 5E O 1s, FIG. 5F C 1s.
Figures 5D, 5E, 5F:
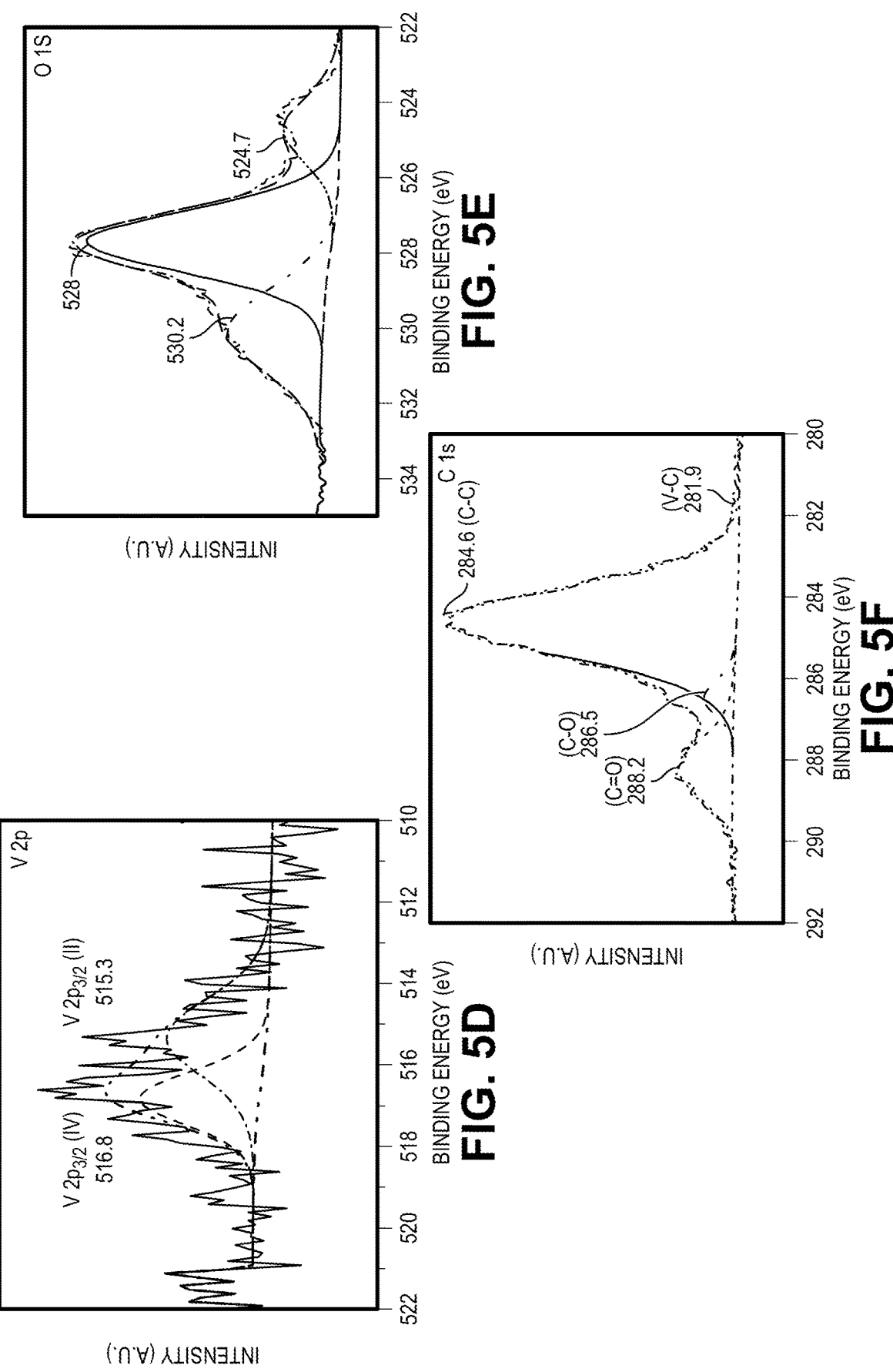

The composition and state of the elements of $TiO_2$ and $V_2AlC@V_2O_5/TiO_2$ composite were further obtained through X-ray photoelectron spectroscopy (XPS), and the results are shown in FIG. 5. XPS analysis of $TiO_2$ is presented in FIG. 5 (a-b). FIG. 5 (a) shows two obvious peaks with binding energies 458.2 and 463.9 eV, associated to Ti $2p_{3/2}$ and $2p_{1/2}$ and confirms the presence of pure $TiO_2$, respectively. FIG. 5 (b) shows XPS spectra for CIs with binding energies 184.6, 286.8 and 288.5 eV, which are attributed to C—C, C—O and C=O, respectively. The XPS spectra of $V_2AlC@V_2O_5/TiO_2$ for Ti, V, O and C are presented in FIG. 5 (c-f). FIG. 5 (c) shows XPS spectra of Ti 2p with three peaks having binding energies 455.3, 458.1 and 464.8 eV. XPS spectra with binding energies 458.1 eV (Ti $2p_{3/2}$) and 464.8 eV (Ti $2p_{1/2}$) confirm the presence of titanium as $Ti^{+4}$ or $TiO_2$. However, another peak at 455.3 eV can be assigned to Ti—C due to interaction with $V_2AlC$.

FIG. 5 (d) shows high resolution XPS V 2p with binding energy 515.3 and 516.8 eV, associated to V (II) and V (IV) in $V_2AlC$ MAX structure. The $V^{4+}$ peak with binding energy 516.8 eV is attributed to vanadium oxide on the surface of the $V_2AlC$ MAX structure. The high-resolution O 1s XPS spectra in FIG. 5 (e) represent three peaks with 524.7, 528 and 530.2 eV binding energies. The peak with binding energy 524.7 eV, is attributed to $V^{4+}$, whereas the other two peaks with binding energies of 528 and 530.2 eV reflects the presence of oxygen due to Ti—O and V—O, respectively. The C is XPS spectra in FIG. 5 (f) show four peaks with binding energies of 281.9, 284.6, 286.5 and 288.2 eV. The peak at 281.9 eV is associated with V—C. Three more peaks with binding energies of 284.6 eV, 286.5 eV, and 288.2 eV, respectively, are associated with C—C, C—O, and C=O bonds. All these results confirm the successful synthesis of $V_2AlC_2@V_2O_5/TiO_2$ composite using a sol-gel single step approach.

The light absorbance of $TiO_2$, $V_2AlC$, $V_2AlC@V_2O_5$ and $V_2AlC@V_2O_5/TiO_2$ composite was further investigated using UV-visible diffuse reflectance (DRS) absorbance spectra. FIG. 6 (a) shows UV-visible absorbance spectra of $V_2AlC$ and $V_2AlC@V_2O_5$ samples. Since pure $V_2AlC$ MAX did not reflect any peaks in the UV or the visible spectra, it exhibits complete UV-visible spectrum light absorption. However, it has higher light absorbance in the visible region due to its blackish color and conductive characteristics. Furthermore, UV-visible absorbance spectra of $V_2AlC@V_2O_5$ shows light absorbance in the visible region. More importantly, one obvious peak between 400 to 500 nm was observed, possibly due to surface plasmon resonance effect of $V_2O_5$, produced over $V_2AlC$ surface. FIG. 6 (b) shows light reflection over the $V_2AlC@V_2O_5$ surface, obtained with 532 nm laser beam. The glowing light over the $V_2AlC$ surface was possibly due to the presence of $V_2O_5$ quantum dots, which have surface plasmon resonance effect. FIG. 6 (c) shows the absorbance spectra of $TiO_2$ and $V_2AlC@V_2O_5/TiO_2$ composite samples. Using $TiO_2$, light absorption in the UV-visible region was observed with a band edge around below 400 nm. When $V_2AlC$ was coupled with $TiO_2$ to construct $V_2AlC@V_2O_5/TiO_2$ composite with higher visible light absorbance, and band edge was shifted to the visible light region, above 400 nm. The band gap energies were estimated using Tauc plot versus photon energy (eV), and the results are displayed in FIG. 6 (d). For pure $TiO_2$ and $V_2AlC@V_2O_5/TiO_2$ composites, the band gap energies estimated were 3.50 and 2.30 eV, respectively.

Previously, when $Ti_3AlC_2$ was loaded to $TiO_2$, band gap energy was increased from 3.14 to 3.22 eV. Similar to this, there was no discernible change in the band gap energy when $V_2AlC$ was coupled with g-$C_3N_4$. The significant decrease in band gap energy of the $TiO_2$ was due to in-situ growth of $V_2O_5$ during the calcination process. All of these results demonstrate that $V_2AlC$ has visible light absorbance characteristics and has a significant impact on reducing $TiO_2$ band gap energy. Previously, a red shift in band gap energy was reported when $Ti_3C_2$ was coupled with g-$C_3N_4/TiO_2$ composite.

The results of the additional investigation into the charge production and separation efficiency of $TiO_2$ and $V_2AlC@V_2O_5$ loaded $TiO_2$ samples are discussed in FIG. 6 (e). It is evident that pure $TiO_2$ has the highest PL intensity because of a higher rate of charge recombination. PL spectra of $V_2AlC$ was approached to zero due to its conductive characteristics and also because of blackish color. However, when $V_2AlC$ was added to $TiO_2$, the PL signal was significantly dropped. The stronger electron conducting ability of the MAX phase is responsible for preventing charges recombination in $V_2AlC@V_2O_5/TiO_2$ composite, resulting in substantially lower PL intensity. The lower PL intensity often indicates more efficient charge carrier separation, which in turn can extend charge lifetime and promote photocatalysis efficiency. Thus, $V_2AlC$ as a cocatalyst shows promise for extending charge lifetime and would be advantageous to promote photocatalysis efficiency.

Nitrogen adsorption-desorption isotherm analysis was carried out to learn more about the BET specific surface area and pore volume of $TiO_2$ and $V_2AlC@V_2O_5/TiO_2$ composite samples, and the results are presented in FIG. 6 (f). The isotherms of type IV were obtained for $TiO_2$ and $V_2AlC/TiO_2$ composite samples. The isotherms have H3 hysteresis loops, demonstrating the presence of a mesoporous structure. The BET surface area and BJH pore volume of all the samples are summarized in Table 1. Pure $TiO_2$ has a BET surface area of 43.01 $m^2/g$ and BJH surface area of 30.94 $m^2/g$, respectively. It can be observed that pure $TiO_2$ has less mesoporous characteristics, resulting in a lower BJH surface area. On the other hand, when $V_2AlC$ was added to $TiO_2$ to construct a $V_2AlC@V_2O_5/TiO_2$ composite, BET surface area of 19.59 $m^2/g$ and BJH surface area of 56.52 $m^2/g$ were obtained. This reduction in BET surface area is most likely the result of $V_2AlC$ having a reduced surface area, which solely serves to support the $TiO_2$ nanoparticles. More surprisingly, the BJH surface area of the $V_2AlC@V_2O_5/TiO_2$ was significantly larger than that of the pure $TiO_2$ NPs. This was possibly due to controlling $TiO_2$ crystal growth during the sol-gel process in the presence of $V_2AlC$ and producing a more mesoporous structure of $TiO_2$. These results are also confirmed during SEM analysis, where more mesoporous structures can be observed. The BJH pore volume and total pore volumes were further calculated, and their values were 0.0457 and 0.0594 $cm^3/g$, respectively, for $TiO_2$. Similarly, BJH pore volume and total pore volumes of 0.1592 and 0.1623 were obtained for $V_2AlC@V_2O_5/TiO_2$ composite, respectively. Comparatively, when $V_2AlC$ was added to pure $TiO_2$, the pore volume was increased. This reveals that $V_2AlC$ MAX is not supportive to increased BET surface area but is beneficial to increased total pore volume.

TABLE 1

Summary of BET surface area, BJH surface area and pore
volumes of TiO₂ and 10% V₂AlC@V₂O₅/TiO₂ composite.

| Catalyst | BET surface area ($m^2$/g) | BJH surface area ($m^2$/g) | BJH pore volume ($cm^3$/g) | Total pore volume ($cm^3$/g) |
|---|---|---|---|---|
| TiO₂ | 43.01 | 30.94 | 0.0457 | 0.0594 |
| 10% V₂AlC@V₂O₅/ TiO₂ | 19.59 | 56.52 | 0.1592 | 0.1623 |

Electrochemical impedance spectroscopy (EIS) measurements are shown by Nyquist plot to measure electric properties such as conductivity in relation of charge separation. The radius of semi circles evaluated the charge separation efficiency of TiO₂ and V₂AlC@V₂O₅/TiO₂ composite and the results are shown in FIG. 7 (*a*). It was observed that by adding V₂AlC, was a much smaller diameter of Nyquist plot was obtained due to lower the resistance to charge transfer and the faster the electron transfer process. This shows a strong heterojunction development, which provides the electron transfer and separation path and prevents charge recombination due to the presence of V₂AlC MAX.

FIG. 7 (*b*) shows cyclic voltammograms of TiO₂ and V₂AlC@V₂O₅/TiO₂ composite samples. The pure TiO₂ and V₂AC@V₂O₅/TiO₂ have different areas under the curve. The CV curve of TiO₂ is quasi-rectangular, with less area under the curve. However, when V₂AlC was loaded to TiO₂, a much larger area was obtained, which shows that the composite possesses superior capacitive performance due to the conductive characteristics of V₂AlC. Additionally, it is clear from the CV curves that the V₂AlC@V₂O₅/TiO₂ increased capacitance in contrast to the pure TiO₂ while using the same scan rate. A bigger included area, as well as the higher current value, can be seen in the CV curve of the V₂AlC@V₂O₅/TiO₂ composite rather than that of the bare TiO₂ at the same conditions. Besides, the V₂AlC/TiO₂ electrode shows more rectangular CV curves, which can be because of the complexity of several redox processes. All of these data suggest that V₂AlC MAX is a potential material for boosting redox area, which would help to improve the effectiveness of photocatalytic CO₂ reduction.

Photocatalytic CO₂ Reduction

Initially, blank experiments were conducted to ensure all the products were obtained from the CO₂ feed mixture only instead from organic residues in the composite photocatalyst. For this purpose, instead of using CO₂[13], experimental validation was conducted in a series of different experiments. For example, the feed mixture (CO₂, H₂O and CH₃OH) was exposed to irradiation without catalysts or the catalyst was exposed to light without the feed mixture. In either case, carbon contained products were below the detectable range of the GC. Similarly, one more experiment was conducted using an inert gas (argon) with photocatalyst and light irradiation, but carbon-based products were not obtained one more time. These quality control experiments confirm that products were not obtained without either photocatalyst or feed mixture, which are mandatory for any photocatalysis process.

Effect of V₂AlC Loading and Sacrificial Reagent

Initially, V₂AlC with different amounts (5, 10 and 15 wt. %) were added to TiO₂, synthesized through sol-gel method and their performance was tested for photocatalytic CO₂ reduction with H₂O as a reducing agent in a fixed bed photoreactor. The findings for CO and CH₄ production are presented in FIG. 8 (*a*). Using pure TiO₂, lower amount of CO and CH₄ with their yield rates of 519.7 and 33.56 μmol g⁻¹ h⁻¹ were obtained, which was significantly increased with V₂AlC loading. Using 5% V₂AlC@V₂O₅/TiO₂ composite, CO and CH₄ production rates of 670 and 198 μmol g⁻¹ h⁻¹ were obtained. The highest efficiency was obtained with 10 wt. % V₂AlC@V₂O₅/TiO₂, in which CO and CH₄ production rates of 785.7 and 337.33 μmol g⁻¹ h⁻¹ was achieved. This amount of CO and CH₄ production was 1.51 and 10.05 folds more than using pristine TiO₂ nanoparticles. More importantly, selectivity for CH₄ production was only 6.06% with TiO₂ which was increased to 30.04% with 10% V₂AlC/V₂O₅. This significantly increased in CH₄ production and selectivity was evidently due to efficient production and separation of photoinduced charge carriers, due to synergetic effect of V₂AlC@V₂O₅, resulting in higher photocatalytic efficiency. Furthermore, a decreased in CO production was observed with higher V₂AlC loading, however, there was no significant effect on CH₄ production. This reveals, V₂AlC@V₂O₅ is promising to maximize the production of methane during photocatalytic CO₂ reduction process.

The effect of irradiation on the performance of TiO₂ and V₂AlC@V₂O₅/TiO₂ composite was first evaluated using water as the reducing agent in a fixed bed photoreactor, and the results are presented in FIG. 8 (*b-c*). FIG. 8 (*b*) shows the production of CO over TiO₂ and V₂AlC/TiO₂ composite at different irradiation times. In both the samples, continuous production of CO was obtained; however, using TiO₂, production reached to steady state after 90 minutes of irradiation time, whereas, for V₂AlC/TiO₂, continuous enhancement in CO production was observed. With a 10% V₂AlC loading, the 720 μmol g⁻¹ CO generation over TiO₂ was increased to 1043 μmol g⁻¹. CO was increased 1.45 times more utilizing V₂AlC@V₂O₅/TiO₂ composite than with TiO₂ alone. Faster charge separation, reduced recombination caused by V₂AlC@V₂O₅, and increased light absorbance were the apparent causes of this photoactivity enhancement. All these findings confirm that coupling V₂AlC@V₂O₅ cocatalyst with TiO₂ would be beneficial to promote photocatalytic CO₂ reduction due to preventing charges recombination and increasing mesoporous characteristics.

The formation of CH₄ over V₂AlC@V₂O₅/TiO₂ composite is presented in FIG. 8 (*c*). Throughout the whole reaction period and in the presence of V₂AlC@V₂O₅/TiO₂ composite, CH₄ production was continuous. CH₄ generation was extremely low when employing TiO₂, but it increased significantly with V₂AlC loading. The efficiency for producing CH₄ was improved by 6.25 times with V₂AlC@V₂O₅/TiO₂ composite compared to using only TiO₂. This was definitely caused by better contact between the TiO₂, V₂AlC and V₂O₅, which led to noticeably increased charge carrier separation and higher visible light absorbance, resulting in higher photoactivity. By comparing results of CO and CH₄ production over V₂AlC/TiO₂ composite, it was observed that increment of CH₄ production was more compared to CO with V₂AlC loading. This was obviously caused by the generation of additional electrons, which were needed to make methane (8 electrons), as opposed to merely need 2 electrons to form carbon monoxide (CO).

The performance of V₂AlC/TiO₂ and V₂AlC@V₂O₅ was further conducted using different synthesis methods. For the synthesis of V₂AlC/TiO₂, a simple physical mixing method was used, whereas, V₂AlC@V₂O₅/TiO₂ composite was synthesized using the sol-gel method. The amount of CO and CH₄ production using 10% V₂AlC@V₂O₅/TiO₂ was 2.65 and 9.78 folds more than using V₂AlC/TiO₂ composite samples. The schematic interaction of $V_2AlC/TiO_2$ and $V_2AlC@V_2O_5/TiO_2$ for charge separation is shown in FIG. 8 (*d*). There are two possible reasons for higher efficiency using $V_2AlC@V_2O_5/TiO_2$ composite. First, there was good interface interaction between $V_2AlC$ and $TiO_2$, produced through sol-gel method, resulting in efficient charge carrier separation. Second, the production of $V_2O_5$ also works as a cocatalyst and improve the charge separation efficiency of $V_2AlC/TiO_2$, resulting in more production and separation of photoinduced charge carriers.

The performance of $V_2AlC@V_2O_5/TiO_2$ composite for photocatalytic $CO_2$ reduction was further conducted through bi-reforming of methanol using methanol-water mixture with $CO_2$. A fixed bed photoreactor with methanol as sacrificial sources was used to test the performance of the $V_2AlC@V_2O_5/TiO_2$ composite. To explore the function of methanol as a hole scavenger, a 5 vol. % solution of methanol in water was first prepared and used to saturate $CO_2$ gas with methanol-water vapors. The CO yield during $CO_2$ photoreduction via $CO_2$—$H_2O$ and bi-reformation of methanol is shown in FIG. 8(*f*). Using both types of feed mixtures, continuous production of CO was observed over the entire irradiation time. Using methanol water mixture, highest CO yield of 27500 μmol g$^{-1}$ was produced, which is 26.35-fold higher than using only water. This illustrates that using methanol as a sacrificial reagent to reduce $CO_2$ to produce CO over $V_2AlC/TiO_2$ is a promising approach. This was obviously due to more production of protons for the reduction of $CO_2$ to produce CO during photocatalysis process.

FIG. 8 (*g*) shows the performance of the $V_2AlC@V_2O_5/TiO_2$ composite for $CH_4$ and $H_2$ evolution during $CO_2$ photoreduction with $H_2O$ and methanol. With $CO_2$—$H_2O$, lower yield of $CH_4$ was produced, which was significantly increased with the use of methanol-water mixture. The highest $CH_4$ production of 665.33 μmol g$^{-1}$ was obtained with methanol-water mixture, which is 1.97-fold more than using only $CO_2$—$H_2O$ mixture. More importantly, production of $H_2$ was not detected using only water, however, when $CH_3OH$—$H_2O$ was employed, $H_2$ yield of 1076.28 mol g$^{-1}$ was produced. These results confirm methanol as the promising reducing agent to activate $CO_2$ reduction through methanol reforming, resulting in significant amount of CO and $H_2$ production in addition of methane formation. This shows that methanol is an efficient $CO_2$ reduction agent over $V_2AlC@V_2O_5/TiO_2$ for the production of $CH_4$ and $H_2$ during photocatalysis process. Therefore, $CO_2$ reduced by the $V_2AlC@V_2O_5/TiO_2$ was more significant for $CH_4$ and synthesis gas production using methanol as the reducing agent. Yields of CO and $H_2$ were significantly increased when $CO_2$ reduction was conducted through bi-reforming of methanol with $CH_3OH/H_2O$ feed mixture. Various hypotheses can be used to explain each of these observations. Water and methanol would more effectively adsorb to the $V_2AlC@V_2O_5/TiO_2$ composite and make it proficient to attach $H_2O$ and $CH_3OH$ to the catalytic surface. The addition of alcohol to the feed mixture also increased the number of protons (H$^+$), which improved CO and $H_2$ production due to increasing reduction process efficiency. In the earlier research on photocatalytic water splitting, methanol was used as the sacrificial agent and observed considerable $H_2$ and $CH_4$ production [18]. In the past, researchers also investigated the efficacy of $Ti_3C_2$ loaded g-$C_3N_4$ with insitu produced $TiO_2$ to reduce $CO_2$ in the presence of different reducing agents such as $CH_3OH$, water, and $H_2$. It was shown that feed mixture consists of $CO_2$ and $H_2O$ favored CO generation, whereas methanol enhanced more $CH_4$ production [19]. In the current work, in addition of significant amount of CO and $CH_4$ production, production of $H_2$ was also produced in an appreciable amount, which demonstrates superiority of current work than the reported work in the literature. This was due to synergistic effect of $VAlC@V_2O_5$ coupled with $TiO_2$ for efficient production and separation of photoinduced charges, resulting in higher photocatalytic efficiency for $CO_2$ reduction to useful products. All these results show that instead of converting $V_2AlC$ MAX into MXene, it can be directly used as a cocatalyst to couple with other semiconductors for renewable energy applications.

Performance of Fixed-Bed and Monolith Reactor

The photocatalyst activity is strongly influenced by the interaction of light irradiation for generation of electrons, catalyst active surface area and reactants attach to catalyst surface. The shape and design of the photoreactors are crucial to maximize photon flux distribution, offer active surface area with a rapid mass transfer rate, and minimize light diffusion effects. Therefore, utilizing a monolith photoreactor, the performance of the $V_2AlC@V_2O_5/TiO_2$ composite for photocatalytic $CO_2$ reduction through bi-reforming of methanol was further examined.

The performance comparison of a $V_2AlC@V_2O_5/TiO_2$ loaded monolithic supports with fixed bed photoreactor for photocatalytic $CO_2$ reduction to produce CO is shown in FIG. 9 (*a*). In a fixed bed photoreactor, CO production was not much higher efficient, and its production was gradual over the irradiation time. Comparatively, using monolith photoreactor, reaction started with higher rate and within 30 minutes, it reached to stead state, giving maximum production of CO. Using monolithic channels with catalysts coated as the thin film, efficient mass transfer process, good interaction between the light irradiation and the catalyst surface was achieved, resulting in significantly production rate initially and reached to stead state within first 30 minutes. The maximum CO yield of 71019.93 μmol g$^{-1}$ was attained with monolith photoreactor, a 2.58-fold more than using fixed bed photoreactor. This significantly higher CO production was due to synergistic effect of $V_2O_5$ grown over $V_2AlC$ for efficient charges separation and more photon flux utilization inside monolith channels to active $TiO_2$ for the production of photoinduced charges. The efficient oxidation and reduction reaction over the monolithic $V_2AlC@V_2O_5/TiO_2$ composite make it possible to proficiently reduce $CO_2$ to CO in monolith photoreactor.

Furthermore, results were entirely different for $CH_4$ production in a fixed bed and monolith photoreactor, and results are shown in FIG. 9 (*b*). Using fixed bed reactor, very small amount of $CH_4$ was produced and its production was gradual over the entire irradiation time. Using monolith photoreactor, highest rate was achieved within 30 minutes, after this it reached to steady state, which continuous $CH_4$ production was achieved over the entire reaction time. The maximum $CH_4$ yield of 110886.076 μmol g$^{-1}$ was obtained using monolith reactor, which is 166.67-fold more than it was produced using fixed bed reactor. This tremendously higher $CH_4$ production was possibly due to more production of charges over the highly illuminated $V_2AlC@V_2O_5/TiO_2$ composite to produce more electrons and their effective separation due to the presence of $V_2O_5$ as the mediator and $V_2AlC$ as a cocatalyst. The efficient adsorption of reactants and desorption of products with surface reactions were also responsible for this significantly enhanced productivity for $CH_4$ formation. Previously, researchers conducted dry reforming of methane ($CO_2$ with $CH_4$) and CO and $H_2$ were the main products [20]. This shows that in a fixed bed reactor, there would be possible production of methane, but it can be reduced to CO due to less efficient sorption process. All of these results confirm that monolith with $V_2AlC@V_2O_5/TiO_2$ is a promising system to selectively convert $CO_2$ to $CH_4$ with higher stability.

The fixed-bed and the monolith photoreactor performance was further investigated for the production of hydrogen using methanol-water mixture with $CO_2$ over $V_2AlC@V_2O_5/TiO_2$ composite and the results are discussed in FIG. 9 (c). Similar to CO and $CH_4$ production trends, production of $H_2$ was gradual in a fixed bed reactor over the reaction time. Using monolith reactor, highest $H_2$ was produced at the beginning of the reaction and then it was continuous over the irradiation time. The somewhat $H_2$ production was declined after 2 hours of reaction time in a monolith photoreactor but still its production was much higher than using fixed bed photoreactor.

Using monolith reactor initially in first 30 minutes, $H_2$ yield of 4087.14 $\mu mol\ g^{-1}$ was produced, which was decreased to 3275.15 $\mu mol\ g^{-1}$ after two hours of reaction time. However, this amount of $H_2$ yield in a monolith reactor was 3.04-fold higher than it was produced using fixed bed reactor. The significantly higher hydrogen production in a monolith photoreactor can be possibly due to activation of methanol-water reforming reactions, which produces hydrogen over the highly efficient $V_2AlC@V_2O_5/TiO_2$ composite, which was suitable to increase hydrogen production. There would also be possibly exitance of water gas shift reaction enabling more production of hydrogen. All these findings are possible due to using highly efficient composite photocatalysts and monolith photoreactor which promoted sorption process, surface reaction and excellent photon flux utilization, resulting in higher yield rate of valuable products.

Comparatively, the monolith performed excellent than the fixed bed photoreactor with $V_2AlC@V_2O_5/TiO_2$ composite for the production of CO, $CH_4$ and $H_2$ over the entire irradiation times. A monolith photoreactor design for photocatalytic $CO_2$ reduction is schematically depicted in FIG. 9(d). Monolithic support has more channels loaded with photocatalyst films than fixed bed reactor does. Every channel has a bigger exposed surface area for the adsorption of reactants where the reaction takes place over the catalyst surface. In a fixed bed reactor, the catalyst is only present in one location and the photocatalytic $CO_2$ reduction process may occur only at the external surface. In this case, all of the light irradiations and reactants have the capacity to be absorbed solely at the illuminated top surface.

The higher efficiency in a monolithic system can be demonstrated based on efficient mass transfer and light penetration effects. Reactants in heterogeneous photocatalysts must cross internal and exterior boundaries to reach the catalyst surface, which restricts the mass transfer mechanism. The transport of reactants to the catalyst surface in a fixed bed photoreactor and the reduction of the adsorption-desorption process are both significant challenges [48]. In contrast, monolithic support has no restrictions on mass transport from the outside or inside because the catalyst has been loaded across the surface of the channels as a thin film. In addition, using monolith photoreactor, efficient light distribution over the catalyst surface was obtained compared to using fixed bed reactor, resulting higher photon flux consumption. The synergistic effect of $V_2O_5$ embedded over $V_2AlC$ was also resorbable to effectively separate electrons from $TiO_2$ towards $V_2AlC$, resulting in significantly improved $CO_2$ reduction efficiency. The promising evolution of $CH_4$ using monolith reactor system confirms more production of electrons in the presence of $V_2AlC@V_2O_5/TiO_2$ composite with efficient mass transfer and surface reactions.

Cyclic Analysis in Monolith Photoreactor

To assess whether a photocatalyst is suitable for commercial use, cyclic tests must be carried out. Through numerous cycles, the performance of the $V_2AlC@V_2O_5/TiO_2$ composite for the photocatalytic reduction of $CO_2$ in a monolith photoreactor system was assessed. Before beginning the next cycle, the lamp was turned off after each completed cycle and the reactor's products were cleaned with feed gases. More importantly, cyclic experiments were conducted using $CO_2$-water for the first two cycles and then $CO_2$ reduction with methanol-water mixture in the next three cycles. The performance of the composite photocatalyst for the formation of CO throughout five consecutive cycles is shown in FIG. 10 (a). During $CO_2$ reduction with water, in the first cycle lower yield of CO was produced, which was significantly increased in the $2^{nd}$ cyclic run. More importantly, in second cycle, a slight rise in CO generation was seen. This may be because during the photocatalysis process, intermediate carbon compounds adsorbed over the catalysts surface reacted through different reforming reactions and were transformed to CO. This would also be possibly due to more activation of $V_2O_5$ due to its multiple oxidation states, which enables to trap and transport charges more effectively. Further cyclic experiments were conducted using $CO_2$ reduction with methanol-water mixture. It was observed that a tremendous increase in CO production was observed in third cycle and its production was continuous and stable until the fifth cyclic run. Evidently, $V_2AlC@V_2O_5/TiO_2$ in a monolith photoreactor with methanol-water mixture was capable for continuous CO production over the complete five cycles. This shows that $V_2AlC$ MAX loaded $TiO_2$ has superior stability for CO evolution during $CO_2$ photoreduction through bi-reforming of methanol. Previously, $Ti_3C_2$ coupled g-$C_3N_4/TiO_2$ composite was tested for four cycles, whereas production of CO as the main product dropped after $4^{th}$ cycle.

The $V_2AlC@V_2O_5/TiO_2$ composite stability assessment for the formation of $CH_4$ throughout five successive cycles are shown in FIG. 10 (b). Using only $CO_2$-water, small amount of methane was produced as it could be observed in first two cycles. However, when $CO_2$ photoreduction was conducted through bi-reforming of methanol, the production of methane was tremendous and continuous over the consecutive five cycles. Similarly, continuous and stable production of $H_2$ was obtained during photocatalytic $CO_2$ reduction through BRM, as shown in FIG. 10 (c). Using only water, production of hydrogen was close to zero in the first two cycles, whereas, when the experiments were conducted with the use of methanol-water mixture, $H_2$ production was higher in thousands of time and it was continuous over the consecutive five cycles. All these results confirm higher efficiency and photostability of $V_2AlC@V_2O_5/TiO_2$ in a monolith photoreactor for stable and continuous production of valuable chemicals and fuels without any deactivation even after five consecutive cycles. In contrast, known catalysts like $Ti_3AlC_2$ MAX coupled with CoAl-LDH/g-$C_3N_4$ demonstrated continuous and stable production of CO and $H_2$ over three cycles, while $V_2C/g$-$C_3N_4$ composite lost stability in cyclic runs.

Production Rate, Selectivity and AQY

The performance of $V_2AlC/TiO_2$ for photocatalytic $CO_2$ reduction in different reforming systems and photoreactors was further discussed based on production rate, selectivity and quantum yield and results are summarized in Table 2. Using $TiO_2$ and $V_2AlC@V_2O_5/TiO_2$ with fixe bed reactor, CO was obtained as the main product during photocatalytic $CO_2$ reduction with $H_2O$. Based on selectivity, it can be observed that $V_2AlC@V_2O_5/TiO_2$ was favorable to promote $CH_4$ selectivity which was increased from 23.08 to 56.43% with $V_2AlC$ loading. When methanol was added to $CO_2$-water mixture, both the production rate and selectivity for CO was significantly increased with appreciable amount of $H_2$ production. The highest CO production of 13750 μmol $g^{-1}$ $h^{-1}$ was obtained over $V_2AlC@V_2O_5/TiO_2$ with $CO_2$—$H_2O$—$CH_3OH$ in a fixed bed, which is 26.39 and 38.19-fold higher than using $V_2AlC@V_2O_5/TiO_2$ and $TiO_2$, respectively without methanol in the feed mixture. This significantly higher CO production with the addition of methanol was due to producing more protons and electrons, which are required for $CO_2$ reduction.

The findings of the performance comparison between fixed bed and monolith photoreactors are presented in Table 2. Comparatively, using monolith photoreactor, production of $CH_4$ was highest compared to CO and $H_2$ during photocatalytic $CO_2$ reduction with methanol-water mixture. The highest $CH_4$, CO and $H_2$ production rates of 55413, 35510 and 1638 μmol $g^{-1}$ $h^{-1}$ were obtained in a monolith photoreactor, which were 166.5, 2.58 and 3.04 folds higher than their production in a fixed bed reactor under the same operating conditions. The selectivity with monolith photoreactor for $CH_4$ production was increased from 8.53 to 85.65%, whereas CO selectivity was decreased from 88.03 to 13.71%. The performance of monolith photoreactor was further compared between first and fourth cycles and observed 1.20 and 1.27 folds increased in $CH_4$ and $H_2$ production, whereas CO production was decreased by 2.58-fold after 4th cycle. The AQY was further compared for CO, $CH_4$ and $H_2$ production using different reforming reactions in fixed-bed and monolith reactors. For $CH_4$ production AQY of 40.185% was obtained in a fixed bed reactor during $CO_2$ photoreduction through BRM reaction, whereas it was only 0.241% in a fixed-bed type photoreactor. Similarly, AQY of 25.738% was obtained for CO production with a monolith photoreactor, which was much higher than using fixed-bed photoreactor system (9.966%). More interestingly, AQY was increased to 48.374% after 4, cycles, which confirms that $V_2AlC@V_2O_5/TiO_2$ become more efficient for methane formation during photocatalysis process.

The performance of current work was further compared with the similar work reported previously. Previously, the role of $V_2AlC$ loaded with g-$C_3N_4$ for photocatalytic dry reforming of methane in a fixed bed reactor investigated. The products obtained were CO and $H_2$ but in a small amount. Recently, the performance of $V_2C$ loaded g-$C_3N_4$ was conducted in a fixed-bed type reactor system for $CO_2$ reduction through BRM. The CO was obtained as the main production with a production rate of 9289 μmol $g^{-1}$ $h^{-1}$ due to efficient charge carrier separation [36]. There are several reports available on the use of MXene based semiconductors to promote photocatalytic $CO_2$ reduction efficiency. For example, $Ti_3C_2$ QDs decorated $NH_2$-MIL-125 (Ti-MOF) was tested for photocatalytic $CO_2$ reduction and a CO yield of 55.7 μmol $g^{-1}$ $h^{-1}$ was reported. The composite efficiency was 2.6-fold more than MOF due to extended visible-light response and the effective separation of photoinduced charges [1]. When $V_2AlC$ coupled with g-$C_3N_4$ was tested for photocatalytic $CO_2$ reduction in a monolith photoreactor, CO and $CH_4$ production rates of 2765 and 871.5 μmol $g^{-1}$ $h^{-1}$ were achieved [48]. Another advancement was testing a composite made of g-$C_3N_4$/$TiO_2$/$Ti_3AlC_2$ MAX for $CO_2$ conversion using a monolith reactor system. The optimal production of CO and $CH_4$ of 1510.44 and 139.77 μmol $g^{-1}$ $h^{-1}$, respectively, were reported. The AQY for CO and $CH_4$ of 2.133 and 0.789% were reported using a monolith photoreactor.

However, when the experiments were conducted in a fixed bed reactor, QY was much higher than using a monolith photoreactor due to using visible light irradiation, which has less penetration power inside monolith channels. Before this, researchers investigated the function of $Ti_3C_2$ with $TiO_2$ for photocatalytic $CO_2$ reduction, where CO was found to be the principal product. CO was the primary product during photocatalytic $CO_2$ reduction in all reported work using $TiO_2$-based composites.

TABLE 2

Performance comparison of fixed-bed and monolith photoreactor for photocatalytic $CO_2$ reduction with water and methanol

| Catalyst | Feed | Reactor | Production rate (μmol $g^{-1}$ $h^{-1}$) | | | Selectivity4 (%) | | | QY (%) | | |
|---|---|---|---|---|---|---|---|---|---|---|---|
| | | | $CH_4$ | CO | $H_2$ | $CH_4$ | CO | $H_2$ | $CH_4$ | CO | $H_2$ |
| TiO2 | $CO_2$—$H_2O$ | Fixed bed | 27 | 360 | — | 23.08 | 76.92 | 0.00 | 0.02 | 0.261 | — |
| $V_2AlC@V_2O_5/TiO_2$ | $CO_2$—$H_2O$ | Fixed bed | 169 | 521 | — | 56.43 | 43.57 | 0.00 | 0.122 | 0.378 | — |
| $V_2AlC@V_2O_5/TiO_2$ | $CO_2$—$H_2OMeOH$ | Fixed bed | 333 | 13750 | 538 | 8.53 | 88.03 | 3.44 | 0.241 | 9.966 | 0.390 |
| $V_2AlC@V_2O_5/TiO_2$ | $CO_2$—$H_2OMeOH$ | Monolith | 55443 | 35510 | 1638 | 85.65 | 13.71 | 0.63 | 40.185 | 25.738 | 1.187 |
| $V_2AlC@V_2O_5/TiO_2$ | $CO_2$—$H_2OMeOH$ | Stability (after 5th cycle) | 66741 | 34986 | 2083 | 87.81 | 11.51 | 0.69 | 48.374 | 25.358 | 1.510 |

The various types of composites materials and their performance for photocatalytic $CO_2$ reduction to various products such as CO, $H_2$, $CH_4$ and $CH_3OH$ has been summarized in Table 3. $V_2ALC$ with in-situ grown $V_2O_5$ dispersed with $TiO_2$ show great promise for moving photo-generated electrons for the conversion of $CO_2$ to CO, $H_2$ and $CH_4$. This was due to heterojunction formation with efficient photoinduced charge carrier separation. When the $V_2AlC$ @$V_2O_5$/$TiO_2$ was coated over the monolithic support a further increased in efficiency was achieved due to more efficient utilization of photon energy and efficient mass transfer process within the monolith microchannels. Thus, $V_2AlC$@$V_2O_5$/$TiO_2$ found much promising to selectively reduce $CO_2$ to produce $CH_4$ in a monolith photoreactor with higher stability.

TABLE 3

Summary of photocatalysts used for hydrogen production by various researchers.

| Catalyst | Feed | Parameters | Production rate ($\mu$mol g$^{-1}$ h$^{-1}$) | Ref. |
|---|---|---|---|---|
| $V_2AlC$@ $V_2O_5$/$TiO_2$ | $CO_2$—$H_2O$—MeOH | Hg lamp, 100 mW cm$^{-2}$ | $CH_4 = 333$ $CO = 13750$ $H_2 = 538$ | Current work |
| $V_2AlC$@ $V_2O_5$/ $TiO_2$monolith | $CO_2$—$H_2O$—MeOH | Hg lamp, 100 mW cm$^{-2}$ | $CH_4 = 55443$ $CO = 35510$ $H_2 = 1638$ | Current work |
| $Ti_3C_2$/$NH_2$-MIL101(Fe) | acetonitrile, water and TEOA (7:2:1 v/v/v) | 300 W Xenon lamp | $55.7$ | [1] |
| MIL-68 (In)-derived $In_2O_3$@$TiO_2$ | $CO_2$—$H_2O$ | 300 W Xenon lamp, I = 80 mW cm$^{-2}$ | $CH_4 = 11.1$ | [2] |
| $TiO_2$/$CsPbBr_3$ | $CO_2$—$H_2O$, TEOA, $CoCl_2$ and 2, 2bipyridine | 300 W Xe lamp, | $CO = 625$ | [21] |
| $La_2Ti_2O_7$/$Ti_3C_2$ | 1% $CO_2$ and 99% $N_2$ and 1 mL of $H_2O$ | Visible light | $CO = 14.78$ $CH_4 = 11.16$ | [22] |
| C/Ag@ urchin-like $TiO_2$ | $CO_2$, $H_2O$ | 300 W Xe lamp | $CH_4 = 5.46$ $CO = 1.51$ | [23] |
| $TiO_2$@$Bi_2MoO_6$ | $CO_2$, $H_2O$ | 300 W Xe lamp | $30.67$ | [7] |
| $Cu_2O$/$Mo_2C$/$TiO_2$ | $CO_2$, 0.5M $KHCO_3$ | LED light, E = 5 mW · cm$^{-2}$ | $CH_3OH = 36.3$ | [24] |

When $CO_2$ was reduced with water, the predominant result was for CO production with a small quantity of $CH_4$ over $V_2AlC$@$V_2O_5$/$TiO_2$ composite. However, production of $CH_4$ and $H_2$ were the greatly improved during $CO_2$ reduction through bi-reforming of methanol. FIG. 11 illustrates the concept of photocatalytic $CO_2$ reduction over a $V_2AlC$@$V_2O_5$/$TiO_2$ composite for the generation of CO, $CH_4$, and $H_2$. Due to their short lifetime, the photogenerated charges on the $TiO_2$ surface under light irradiation have the ability to combine again. However, due to partial oxidation of $V_2O_5$, there was heterojunction construction between $V_2AlC$/$TiO_2$ and $V_2O_5$/$TiO_2$, resulting in efficient separating photoinduced charges with their minimum recombination. The electrons are first produced over $TiO_2$ under UV-light irradiation, which were transferred to $V_2O_5$ due to lower conduction band position compared to $TiO_2$, whereas holes were transferred from VB of $V_2O_5$ to $TiO_2$ due to their suitable position. On the other due to good interface interaction and well-dispersed $TiO_2$ over $V_2AlC$, electrons were effectively transferred towards $V_2AlC$.

During the photocatalysis process, upon light irradiation over $TiO_2$, electrons and holes are produced, as shown in Eq. (8). The electrons produced over CB of $TiO_2$ were transferred to $V_2O_5$ and $V_2AlC$, thus intriguing for trapping and transporting electrons from $TiO_2$ as shown in Eq. (9) and (10). The holes and water are used for the oxidation of water and methanol for the production of protons, as shown by Eq.

(11) and (12). On the other hand, electrons were consumed for the reduction of $CO_2$, as discussed in Eq. (13). Finally, electrons and holes were consumed for the production of CO, $CH_4$ and $H_2$ according to the reaction in Eq. (14)-(16), respectively.

Photoexcitation of $V_2AlC$/$TiO_2$:

$$TiO_2 \rightarrow TiO_2(e_{cb}^-) + TiO_2(h_{vb}^+) \tag{8}$$

$$TiO_2(e_{cb}^-) + VO_2 \rightarrow TiO_2 + VO_2(e_{cb}^-) \tag{9}$$

$$VO_2(e_{cb}^-) + V_2AlC \rightarrow VO_2 + V_2AlC(e_{cb}^-) \tag{10}$$

Oxidation Reactions:

$$H_2O + 2H^+ \rightarrow \frac{1}{2}O_2 + 2H^+ \tag{11}$$

$$CH_3OH + H_2O \rightarrow CO_2 + 6H^+ + 6e^- \tag{12}$$

33

Reduction Reactions:

$$CO_2 + e^- \rightarrow \cdot CO_2^- \tag{13}$$

$$\cdot CO_2^- + 2H^+ + e^- \rightarrow CO + H_2O \tag{14}$$

$$\cdot CO_2^- + 8H^+ + 7e^- \rightarrow CH_4 + H_2O \tag{15}$$

$$2H^+ + 2e^- \rightarrow H_2 \tag{16}$$

Using a fixed bed reactor, the yield of these products was very low, which was significantly increased when a monolith photoreactor was employed. Thus, the proposed mechanism can be explained based on three factors, efficient charge carrier separation with the presence of $V_2AlC$, the role of sacrificial reagents and efficient photon flux utilization and mass transfer in a monolith photoreactor. Using a fixed bed photoreactor, a small area was available for the photocatalysis process, resulting in a lower $CO_2$ reduction process. The generation of CO was significantly higher than that of $CH_4$ because of the favorable reaction due to involving only two electrons and two protons. Using a of fixed bed reactor, fewer electrons and holes were produced, which favors higher CO production compared to $CH_4$ and $H_2$. This reaction was much slower with water only, whereas only CO was produced with smaller amount of $CH_4$ formation, while $H_2$ production was not obtained. In addition, more protons and electrons were produced with methanol, more significant for contributing to the larger amount of CO evolution in addition to $CH_4$ and $H_2$ formation.

The performance of $V_2AlC@V_2O_5/TiO_2$ was further improved when a monolith photoreactor was utilized since there was lighter available for the generation of electrons due to the monolithic surface with more lighted active surface area. Thus, in the case of monolith photoreactor, efficient light penetration inside the channels was more efficient due to multiple channels, resulting in more production of electrons and holes with higher photon flux utilization. Thus, $V_2AlC@V_2O_5/TiO_2$ composite in a monolith photoreactor was promising to produce $CH_4$ as the main product with lower CO, whereas an appreciable amount of $H_2$ was also produced. This was possibly due to converting both CO and $CO_2$ to $CH_4$ in the presence of abundance electrons and holes inside the monolith reactor. In addition to this, due to catalyst reaction over the thin film, there were surface reactions only within the monolithic surface, resulting in efficient reaction kinetics and minimum mass transfer limitations. Thus, when the catalyst was immobilized as a thin layer over the surface of a monolith, this increased active surface illumination allowed for more significant generation of photoinduced charge carriers, resulting in the $CO_2$ reduction to valuable chemicals and fuels.

REFERENCES

[1] Y. H. Park, D. Kim, C. B. Hiragond, J. Lee, J.-W. Jung, C.-H. Cho, I. In, S.-I. In, Phasecontrolled 1T/2H—MoS_2 interaction with reduced $TiO_2$ for highly stable photocatalytic $CO_2$ reduction into CO, J. $CO_2$ Util., 67 (2023) 102324.

[2] A.-Y. Lo, Y.-C. Chung, P.-J. Xie, H. Delbari, Z.-H. Yang, F. Taghipour, Effect of Ag-doping strategies on the Lewis acid/base behavior of mesoporous $TiO_2$ photocatalyst and its performance in $CO_2$ photoreduction, Applied Materials Today, 32 (2023) 101811.

[3] S. Yang, K. Wang, Q. Chen, Y. Wu, Enhanced photocatalytic hydrogen production of scheme $TiO_2/g$-$C_3N_4$ heterojunction loaded with single-atom Ni, J. Mater. Sci. Technol., 175 (2024) 104-114.

[4] S. Zhu, W. Liao, M. Zhang, S. Liang, Design of spatially separated Au and CoO dual cocatalysts on hollow $TiO_2$ for enhanced photocatalytic activity towards the reduction of $CO_2$ to $CH_4$, Chem. Eng. J., 361 (2019) 461-469.

[5] O. Mekasuwandumrong, N. Jantarasorn, J. Panpranot, M. Ratova, P. Kelly, P. Praserthdam, Synthesis of $Cu/TiO_2$ catalysts by reactive magnetron sputtering deposition and its application for photocatalytic reduction of $CO_2$ and $H_2O$ to $CH_4$, Ceram. Int., 45 (2019) 22961-22971.

[6] J. Jin, S. Chen, J. Wang, C. Chen, T. Peng, One-pot hydrothermal preparation of PbO decorated brookite/anatase $TiO_2$ composites with remarkably enhanced $CO_2$ photoreduction activity, Applied Catalysis B: Environmental, 263 (2020) 118353.

[7] A. Raza, H. Shen, A. A. Haidry, L. Sun, R. Liu, S. Cui, Studies of Z-scheme $WO_3TiO_2/Cu_2ZnSnS_4$ ternary nanocomposite with enhanced $CO_2$ photoreduction under visible light irradiation, Journal of $CO_2$ Utilization, 37 (2020) 260-271.

[8] Z. Wang, Y. Chen, L. Zhang, B. Cheng, J. Yu, J. Fan, Step-scheme $CdS/TiO_2$ nanocomposite hollow microsphere with enhanced photocatalytic $CO_2$ reduction activity, Journal of Materials Science & Technology, 56 (2020) 143-150.

[9] W. W. Yang, G. Ma, Y. Fu, K. Peng, H. Yang, X. Zhan, W. Yang, L. Wang, H. Hou, Rationally designed $Ti_3C_2$ MXene@$TiO_2$/CuInS_2 Schottky/S-scheme integrated heterojunction for enhanced photocatalytic hydrogen evolution, Chem. Eng. J., 429 (2022) 132381.

[10] W. Lei, T. Zhou, X. Pang, S. Xue, Q. Xu, Low-dimensional MXenes as noble metal-free cocatalyst for solar-to-fuel production: Progress and prospects, J. Mater. Sci. Technol., 114 (2022) 143-164.

[11] S. Zada, H. Lu, F. Yang, Y. Zhang, Y. Cheng, S. Tang, W. Wei, Y. Qiao, P. Fu, H. Dong, X. Zhang, $V_2C$ Nanosheets as Dual-Functional Antibacterial Agents, ACS Applied Bio Materials, 4 (2021) 4215-4223.

[12] J. Bai, W. Chen, R. Shen, Z. Jiang, P. Zhang, W. Liu, X. Li, Regulating interfacial morphology and charge-carrier utilization of $Ti_3C_2$ modified all-sulfide CdS/$ZnIn_2S_4$ S-scheme heterojunctions for effective photocatalytic $H_2$ evolution, J. Mater. Sci. Technol., 112 (2022) 85-95.

[13] M. Tahir, Enhanced photocatalytic $CO_2$ reduction to fuels through bireforming of methane over structured 3D MAX $Ti_3AlC_2/TiO_2$ heterojunction in a monolith photoreactor, J. $CO_2$ Util., 38 (2020) 99-112.

[14] M. Tahir, B. Tahir, Constructing S-scheme 2D/OD g-$C_3N_4/TiO_2$ NPs/MPs heterojunction with 2D-$Ti_3AlC_2$ MAX cocatalyst for photocatalytic $CO_2$ reduction to CO/$CH_4$ in fixed-bed and monolith photoreactors, J. Mater. Sci. Technol., 106 (2022) 195-210.

[15] K. Wang, H. Du, Z. Wang, M. Gao, H. Pan, Y. Liu, Novel MAX-phase $Ti_3AlC_2$ catalyst for improving the reversible hydrogen storage properties of $MgH_2$, Int. J. Hydrogen Energy, 42 (2017) 4244-4251.

[16] M. Tahir, B. Tahir, Z. Y. Zakaria, A. Muhammad, Enhanced photocatalytic carbon dioxide reforming of methane to fuels over nickel and montmorillonite supported $TiO_2$ nanocomposite under UV-light using monolith photoreactor, J. Cleaner Prod., 213 (2019) 451-461.

[17] M. Tahir, Well-designed $ZnFe_2O_4/Ag/TiO_2$ nanorods heterojunction with Ag as electron mediator for photocatalytic $CO_2$ reduction to fuels under UV/visible light, J. $CO_2$ Util., 37 (2020) 134-146.

[18] S. Tasleem, M. Tahir, Investigating the performance of liquid and gas phase photoreactors for dynamic $H_2$ production over bimetallic $TiO_2$ and $Ni_2P$ dispersed MAX $Ti_3AlC_2$ monolithic nanocomposite under UV and visible light, J. Environ. Chem. Eng., 9 (2021) 105351.

[19] M. Tahir, B. Tahir, In-situ growth of $TiO_2$ imbedded $Ti_3C_2T_A$ nanosheets to construct $PCN/Ti_3C_2T_A$ MXenes 2D/3D heterojunction for efficient solar driven photocatalytic $CO_2$ reduction towards CO and $CH_4$ production, J Colloid Interface Sci, 591 (2021) 20-37.

[20] A. Ali Khan, M. Tahir, N. Khan, Process optimization and kinetic study for solar-driven photocatalytic methane bi-reforming over $TiO_2/Ti_3C_2$ supported $CoAlLa$-$LDH$-$g$-$C_3N_4$ dual S scheme nanocomposite, Energy Conversion and Management, 286 (2023) 117021.

[21] L. Wang, J. Qiu, N. Wu, X. Yu, X. An, $TiO_2/CsPbBr_3$ S-scheme heterojunctions with highly improved $CO_2$ photoreduction activity through facet-induced Fermi level modulation, J Colloid Interface Sci, 629 (2023) 206-214.

[22] K. Wang, M. Cheng, N. Wang, Q. Zhang, Y. Liu, J. Liang, J. Guan, M. Liu, J. Zhou, N. Li, Inter-plane 2D/2D ultrathin $La_2Ti_2O_7/Ti_3C_2$ MXene Schottky heterojunctions toward high efficiency photocatalytic $CO_2$ reduction, Chin. J. Catal., 44 (2023) 146-159.

[23] B. Yuan, H. Qian, Z. Luo, R. Zhu, W. Luan, A green synthetic approach for C/Ag @urchinlike $TiO_2$ nanocomposites showing a highly molar ratio $CH_4/CO$ for $CO_2$ photoreduction, Materials Letters, 349 (2023) 134758.

[24] I. Merino-Garcia, G. García, I. Hernández, J. Albo, An optofluidic planar microreactor with photoactive $Cu_2O/Mo_2C/TiO_2$ heterostructures for enhanced visible light-driven $CO_2$ conversion to methanol, J. $CO_2$ Util., 67 (2023) 102340.

The invention claimed is:

1. A composite photocatalyst comprising $V_2AlC@V_2O_5/TiO_2$ heterojunction; wherein $V_2O_5$ is in-situ grown on $V_2AlC$ and $TiO_2$ nanoparticles are distributed over the whole surface of $V_2AlC$; wherein $V_2AlC$ is from about 1 to about 20 wt. %; $V_2O_5$ is from about 0 to about 10 wt. %; and $TiO_2$ is from about 60 to about 99 wt. %; and the composite is a supported composite or an unsupported composite.

2. The composite photocatalyst of claim 1, wherein $TiO_2$ is distributed over the whole surface of $V_2AlC$ as verified by microscopy.

3. The composite photocatalyst of claim 1, wherein V, Al, C, Ti and O are evenly and uniformly distributed within the composite.

4. The composite photocatalyst of claim 1, wherein the composite is a nanocomposite having a particle size of about 2 nm to about 50 nm.

5. The composite photocatalyst of claim 1, wherein the support is a honeycomb support and the composite is supported on a monolithic honeycomb support.

6. The composite photocatalyst of claim 1, wherein the supported composite is prepared by coating $V_2AlC@V_2O_5/TiO_2$ on a support by a sol-gel dip-coating method on a monolithic honeycomb support.

* * * * *